US012043360B2

(12) United States Patent
Kimpara et al.

(10) Patent No.: US 12,043,360 B2
(45) Date of Patent: Jul. 23, 2024

(54) OPERATION DEVICE FOR SHIP PROPULSION MACHINE

(71) Applicant: SUZUKI MOTOR CORPORATION, Hamamatsu (JP)

(72) Inventors: Masatoshi Kimpara, Hamamatsu (JP); Toshiya Kataoka, Hamamatsu (JP)

(73) Assignee: SUZUKI MOTOR CORPORATION, Hamamatsu (JP)

( * ) Notice: Subject to any disclaimer, the term of this patent is extended or adjusted under 35 U.S.C. 154(b) by 409 days.

(21) Appl. No.: 17/565,139

(22) Filed: Dec. 29, 2021

(65) Prior Publication Data

US 2022/0212767 A1 Jul. 7, 2022

(30) Foreign Application Priority Data

Jan. 7, 2021 (JP) ................................ 2021-001449

(51) Int. Cl.
*B63H 21/21* (2006.01)
*B63H 20/00* (2006.01)
*G05G 9/047* (2006.01)

(52) U.S. Cl.
CPC ........... *B63H 21/213* (2013.01); *G05G 9/047* (2013.01); *B63H 20/00* (2013.01); (Continued)

(58) Field of Classification Search
CPC ...... B63H 21/21; B63H 21/213; B63H 20/20; B63H 2021/216; G05G 9/047; G05G 2009/04755; G05G 2009/04766
See application file for complete search history.

(56) References Cited

U.S. PATENT DOCUMENTS

| | | | | |
|---|---|---|---|---|
| 4,090,598 | A | 5/1978 | Prince | 192/96 |
| 2007/0149070 | A1 * | 6/2007 | Okuyama | B63H 21/213 440/84 |
| 2018/0209537 | A1 * | 7/2018 | Kitada | B63H 20/14 |

FOREIGN PATENT DOCUMENTS

| | | |
|---|---|---|
| JP | S 51-051696 A | 5/1976 |
| JP | S 53-100593 A | 9/1978 |

(Continued)

OTHER PUBLICATIONS

Office Action mailed Apr. 30, 2024, issued to the corresponding Japanese Application No. 2021-001449.

*Primary Examiner* — Stephen P Avila
(74) *Attorney, Agent, or Firm* — Stein IP, LLC

(57) ABSTRACT

An operation device includes a lever, a holder rotatably supporting the lever, a rotation restriction mechanism restricting a rotation range of the lever to the rotation range including a forward movement operation range, a backward movement operation range, and a neutral position, and a lever holding mechanism holding the lever at the neutral position. The lever includes a base portion rotatable supported by the holder, and an operation portion being movably connected to the base portion with respect to the base portion in an extending direction of the operation portion. The lever holding mechanism holds the lever at the neutral position so as not to be rotatable when the operation portion moves toward one side in the extending direction, and brings the lever into a rotatable state from the neutral position when the operation portion moves toward the other side in the extending direction.

6 Claims, 10 Drawing Sheets

(52) U.S. Cl.
CPC .................. *B63H 2021/216* (2013.01); *G05G 2009/04755* (2013.01); *G05G 2009/04766* (2013.01)

(56) References Cited

FOREIGN PATENT DOCUMENTS

| | | | |
|---|---|---|---|
| JP | 2014-237399 | A | 12/2014 |
| JP | 2018-118552 | A | 8/2018 |

* cited by examiner

OPERATION DEVICE FOR SHIP PROPULSION MACHINE

CROSS-REFERENCE TO RELATED APPLICATIONS

The disclosure of Japanese Patent Application No. 2021-001449 filed on Jan. 7, 2021, including specification, drawings and claims is incorporated herein by reference in its entirety.

TECHNICAL FIELD

The present invention relates to an operation device for a ship propulsion machine.

BACKGROUND ART

In general, a ship is provided with a ship propulsion machine such as an inboard motor, an inboard-outdrive motor, or an outboard motor. The ship propulsion machine usually includes a power source such as an internal combustion engine or an electric motor, a drive shaft, a gear mechanism, a propeller shaft and a propeller. The drive shaft is rotated by a power of the power source, and rotation of the drive shaft is transmitted to the propeller shaft via the gear mechanism. Thereby, the propeller shaft and the propeller fixed to the propeller shaft are rotated, and a propulsive force of the ship is generated by rotation of the propeller.

The ship propulsion machine further includes a clutch. The clutch has a function of selecting whether to transmit the power of the power source to the propeller shaft, and a function of selecting a rotation direction of the propeller shaft when the power of the power source is transmitted to the propeller shaft. That is, the gear mechanism is provided with a forward gear that rotates the propeller shaft in one direction in order to generate a propulsive force in a direction in which the ship moves forward, and a reverse gear that rotates the propeller shaft in a reverse direction in order to generate a propulsive force in a direction in which the ship moves backward. The clutch selectively connects one of the forward gear and the reverse gear to the propeller shaft. When the forward gear and the propeller shaft are connected to each other, the propulsive force in the direction in which the ship moves forward is generated, and the ship moves forward. When the reverse gear and the propeller shaft are connected to each other, the propulsive force in the direction in which the ship moves backward is generated, and the ship moves backward. The clutch can also create a state in which neither the forward gear nor the reverse gear is connected to the propeller shaft. When neither the forward gear nor the reverse gear is connected to the propeller shaft, a propulsive force of the ship is not generated. This makes it possible to maintain a state in which the ship is stopped while operating the power source.

In addition, the ship is provided with an operation device that is performed an operation related to the propulsive force of the ship generated by the ship propulsion machine. This operation device is generally called a remote control device. The operation device is usually attached to a console that steers the ship, or an inner side surface of a hull at a position close to an operator's seat.

The operation device includes, for example, a lever rotatable in a front-rear direction, and has a function of switching a direction of the propulsive force of the ship according to a rotation direction of the lever and a function of increasing or decreasing the propulsive force of the ship according to a rotation angle (rotation amount) of the lever. For example, when the user rotates the lever of the operation device forward in a state in which the power source is operating, the clutch of the ship propulsion machine is operated, and the forward gear and the propeller shaft are connected. Thereby, the direction of the propulsive force of the ship is the direction in which the ship moves forward. On the other hand, when the user rotates the lever rearward, the clutch is actuated, and the reverse gear and the propeller shaft are connected. Thereby, the direction of the propulsive force of the ship is the direction in which the ship moves backward. When the user sets the lever to the neutral position, neither the forward gear nor the reverse gear is connected to the propeller shaft by the clutch, and the propulsive force of the ship is not generated.

In the state in which the power source is operating, as an angle at which the user rotates the lever forward increases, a rotation speed of the power source increases, the propulsive force in the direction in which the ship moves forward increases, and a forward movement speed of the ship increases. In addition, as an angle at which the user rotates the lever rearward increases, the rotation speed of the power source increases, the propulsive force in the direction in which the ship moves backward increases, and a backward movement speed of the ship increases.

Patent Literature 1 below discloses an example of a remote control device.

Patent Literature 1: JP-A-2014-237399.

SUMMARY OF INVENTION

In order to solve the above problems, an operation device according to the present invention is an operation device configured to be performed an operation related to a propulsive force of a ship generated by a ship propulsion machine provided in the ship, the operation device including: a lever rotatable about a rotation axis and configured to be performed the operation related to the propulsive force of the ship by being rotated; a holder fixed to the ship or a component provided in the ship and rotatably supporting the lever; a rotation restriction mechanism configured to restrict a rotation range of the lever with respect to the holder to a predetermined rotation range including a forward movement operation range in which an operation of increasing or decreasing a propulsive force for moving the ship forward is performed, a backward movement operation range in which an operation of increasing or decreasing a propulsive force for moving the ship backward is performed, and a neutral position at which the propulsive force of the ship is not generated; and a lever holding mechanism configured to hold the lever at the neutral position, wherein the lever includes a base portion supported by the holder so as to be rotatable about the rotation axis, and an operation portion connected to the base portion, extending in a direction intersecting the rotation axis, and configured to rotate the base portion with respect to the holder by being gripped and moved by a hand, and the operation portion is connected to the base portion so as to be movable with respect to the base portion in an extending direction of the operation portion, and wherein the lever holding mechanism holds the lever at the neutral position so as not to be rotatable when the lever is positioned at the neutral position and the operation portion moves toward one side in the extending direction of the operation portion with respect to the base portion, and brings the lever into a rotatable state from the neutral position when the lever is positioned at the neutral position and the operation portion moves toward the other side in the extending direction of the operation portion with respect to the base portion.

DESCRIPTION OF EMBODIMENTS

Figure 1:
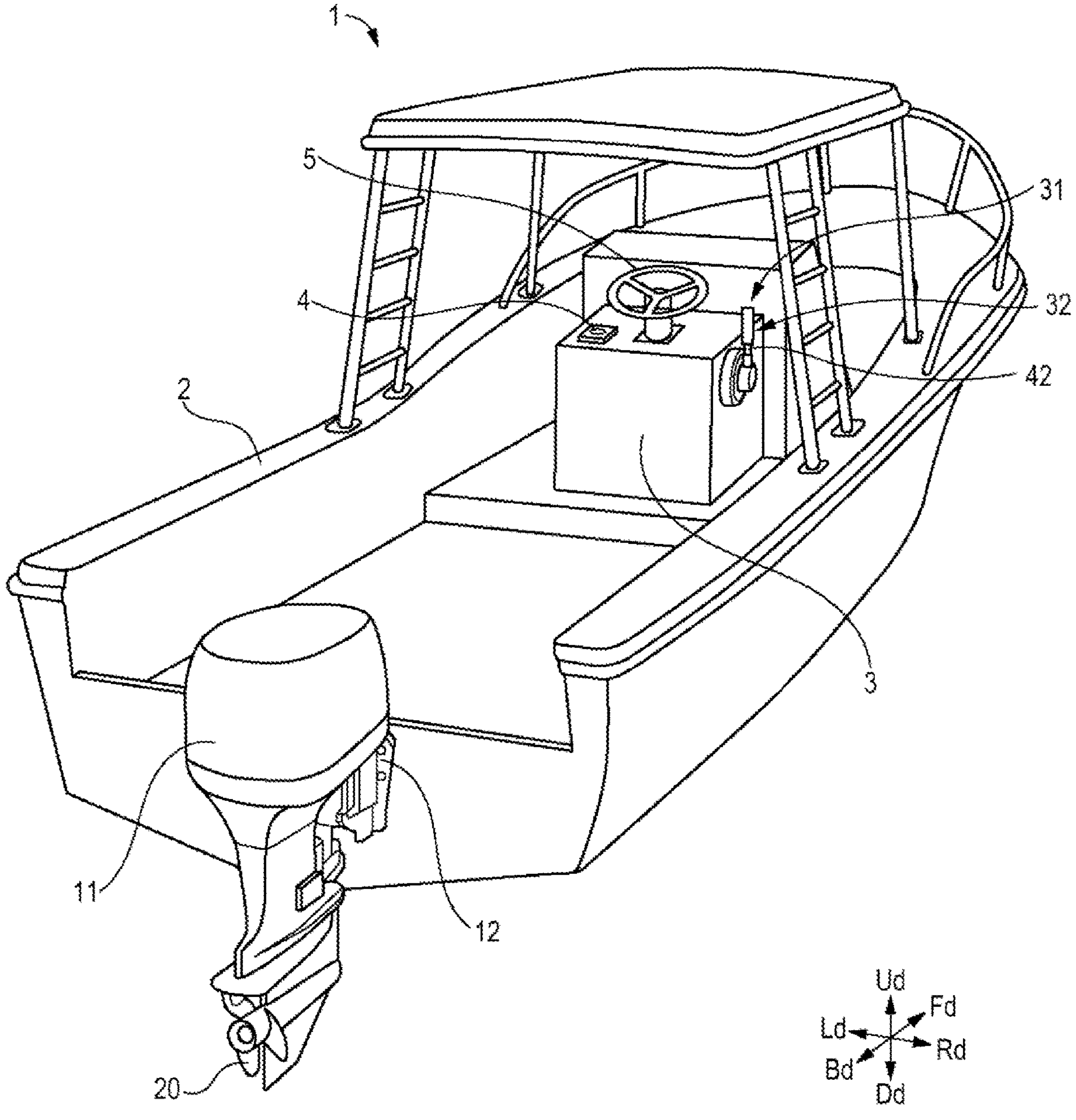
FIG. 1 is a perspective view showing a ship provided with a remote control device as an operation device according to a first embodiment of the present invention.

In markets of ships, ship propulsion machines, or devices related thereto, there is a market that requires a function of holding a lever of an operation device so as not to easily rotate from a neutral position when the lever is positioned at the neutral position, and a market that does not require such a function. In the market that requires the function of holding the lever so as not to easily rotate from the neutral position, in related art, there has been provided an operation device including a mechanism that holds the lever so as not to rotate when the lever is positioned at the neutral position, and a release button for releasing such a non-rotatable holding state of the lever. In this related-art operation device, the release button is a button designed to be pressed by a finger. The release button is provided in a part of a grip of the lever or in vicinity of the grip such that the release button can be pressed by the finger of a hand gripping the grip of the lever.

This related-art operation device has a problem that it may be difficult to press the release button depending on a steering posture of a user who steers the ship. That is, when the user faces the front of the ship and firmly grips the grip of the lever in a correct steering posture, an operation of pressing the release button with the finger of the hand gripping the grip is usually not difficult. However, when the user faces sideways or obliquely backward and the steering posture is out of order, and thus the grip of the lever cannot be firmly gripped, it may be difficult to perform the operation of pressing the release button with the finger of the hand gripping the grip. In addition, when a temperature is low, such as in winter, the finger cannot be moved as intended if the hand is numb. In such a case, even when the user firmly grips the grip in a correct driving posture, it may be difficult to perform the operation of pressing the release button with the finger of the hand gripping the grip.

This point will be described by taking a remote control device (16) disclosed in Patent Literature 1 as an example. The remote control device (16) disclosed in Patent Literature 1 includes a control box (33) and a control lever (34) swingably supported by the control box (33). The control box (33) is provided with a stopper (49), and the control lever (34) is provided with a neutral lock lever (44). The neutral lock lever (44) is biased downward by a spring (48), and a lower end portion of the neutral lock lever (44) is locked to the stopper (49) by a biasing force of the spring (48). When the lower end portion of the neutral lock lever (44) is locked to the stopper (49), the control lever (34) is positioned at a neutral position in a substantially fixed state.

In the remote control device (16), an upper portion of the neutral lock lever (44) is positioned in vicinity of a grip (42) of the control lever (34). The upper portion of the neutral lock lever (44) corresponds to a release button for releasing the state in which the control lever (34) is fixed to the neutral position. That is, when the user pushes the neutral lock lever (44) upward with a finger of a hand gripping the grip (42), the neutral lock lever (44) moves upward against the biasing force of the spring (48), and engagement between the lower end portion of the neutral lock lever (44) and the stopper (49) is released. This allows the control lever (34) to swing from the neutral position.

In the remote control device (16) having such a configuration, when the user cannot firmly grip the grip (42) of the control lever (34), or when the hand is numb and the finger cannot be moved as intended, it may be difficult to perform an operation of pushing the upper portion of the neutral lock lever (44) upward against the biasing force of the spring (48) with the finger of the hand gripping the grip (42).

The present invention has been made in view of, for example, the above-described problems, and an object thereof is to provide an operation device for a ship propulsion machine having a mechanism that holds a lever in a neutral position so as not to be rotatable, the operation device being capable of enhancing ease of an operation of releasing a non-rotatable holding state of the lever.

According to the present invention, in the operation device having the mechanism that holds the lever at the neutral position so as not to be rotatable, ease of an operation of releasing a non-rotatable holding state of the lever can be enhanced.

An operation device according to an exemplary embodiment of the present invention is a device that is performed an operation related to a propulsive force of a ship generated by a ship propulsion machine provided in the ship. The ship propulsion machine is, for example, an inboard motor, an inboard-outdrive motor, or an outboard motor. A power source of the ship propulsion machine may be an internal combustion engine, an electric motor or a hybrid type in which an internal combustion engine and an electric motor are combined.

The operation device includes a lever, a holder that supports the lever, a rotation restriction mechanism that restricts a rotation range of the lever, and a lever holding mechanism that holds the lever at a neutral position. The lever is provided so as to be rotatable about a rotation axis. A user can perform an operation related to the propulsive force of the ship by rotating the lever. The holder is a member that rotatable supports the lever. The holder is fixed to the ship or a component provided in the ship.

The rotation restriction mechanism is a mechanism that restricts the rotation range of the lever with respect to the holder to a predetermined rotation range. The predetermined rotation range includes a forward movement operation range in which an operation of increasing or decreasing a propulsive force for moving the ship forward is performed, a backward movement operation range in which an operation of increasing or decreasing a propulsive force for moving the ship backward is performed, and a neutral position at which a propulsive force of the ship is not generated. Hereinafter, the propulsive force for moving the ship forward is referred to as a "forward movement propulsive force", and the propulsive force for moving the ship backward is referred to as a "backward movement propulsive force".

The operation device controls the ship propulsion machine according to rotation of the lever to increase or decrease the propulsive force of the ship, to switch a direction of the propulsive force of the ship or to prevent generation of the propulsive force of the ship. A method of controlling the ship propulsion machine by the operation device may be a method of controlling the ship propulsion machine by mechanically connecting the operation device and the ship propulsion machine via a cable and pushing or pulling the cable according to the rotation of the lever, or may be a method of controlling the ship propulsion machine based on an electrical signal output from a sensor by providing the operation device with the sensor that detects a rotation angle of the lever and outputs the electrical signal indicating the rotation angle of the lever, and electrically connecting the sensor and the ship propulsion machine via an electric wire.

The user grips the lever by hand and rotates the lever to change a rotation direction or a rotation angle (rotation amount) of the lever, thereby performing the operation related to the propulsive force of the ship, that is, an operation of increasing or decreasing the propulsive force of the ship, an operation of switching a direction of the propulsive force of the ship, or an operation of preventing the generation of the propulsive force of the ship.

Specifically, in a state in which the power source of the ship propulsion machine is operating, when the user rotates the lever to, for example, a front side and positions the lever within the forward movement operation range, the forward movement propulsive force is generated by the ship propulsion machine. When the user changes the rotation angle of the lever within the forward movement operation range, the forward movement propulsive force generated by the ship propulsion machine changes. On the other hand, in the state in which the power source of the ship propulsion machine is operating, when the user rotates the lever, for example, rearward and positions the lever within the backward movement operation range, the backward movement propulsive force is generated by the ship propulsion machine. When the user changes the rotation angle of the lever within the backward movement operation range, the backward movement propulsive force generated by the ship propulsion machine changes.

In the state in which the power source of the ship propulsion machine is operating, when the user positions the lever at the neutral position, the propulsive force of the ship is not generated by the ship propulsion machine. Specifically, a power of the power source of the ship propulsion machine is not transmitted to a propeller shaft, and although the power source is operating, rotation of a propeller stops.

In the operation device according to the exemplary embodiment of the present invention, the lever includes a base portion and an operation portion. The base portion is supported by the holder so as to be rotatable about the rotation axis. The operation portion is connected to the base portion and extends in a direction intersecting the rotation axis. The user rotates the base portion with respect to the holder by gripping and moving the operation portion by hand. As described above, the user uses the lever to perform the operation of increasing or decreasing the propulsive force of the ship, the operation of switching the direction of the propulsive force of the ship, or the operation of preventing the generation of the propulsive force of the ship. The user performs such operations by gripping and moving the operation portion by hand to rotate the base portion (the entire lever).

The operation portion is connected to the base portion so as to be movable in an extending direction of the operation portion with respect to the base portion.

When the lever is positioned at the neutral position and the operation portion moves toward one side in the extending direction of the operation portion with respect to the base portion, the lever holding mechanism holds the lever at the neutral position so as not to be rotatable. When the lever is positioned at the neutral position and the operation portion moves to the other side in the extending direction of the operation portion with respect to the base portion, the lever holding mechanism releases a non-rotatable holding state of the lever and allows the lever to rotate from the neutral position.

When the lever is positioned within the forward movement operation range or the backward movement operation range, the user grips the operation portion by hand, rotates the lever to move the lever to the neutral position, and moves the operation portion toward the one side in the extending direction of the operation portion, whereby the lever can be held at the neutral position so as not to be rotatable. When the lever is held at the neutral position so as not to be rotatable, the user can release the non-rotatable holding state of the lever by gripping the operation portion by hand and moving the operation portion to the other side in the extending direction of the operation portion. An operation of gripping the operation portion of the lever by hand and moving the operation portion to the other side in the extending direction of the operation portion can be easily performed, for example, even when the user faces sideways or obliquely backward and a steering posture is out of order. In addition, the operation of gripping the operation portion of the lever by hand and moving the operation portion to the other side in the extending direction of the operation portion can be easily performed even when the hand is numb and a finger cannot be moved as intended. Therefore, the user can easily release a state in which the lever is held at the neutral position so as not to be rotatable, even when the steering posture is out of order or even when the finger cannot be moved as intended. In this way, according to the operation device according to the exemplary embodiment of the present invention, ease of the operation of releasing the non-rotatable holding state of the lever can be enhanced.

First Embodiment (Outboard Motor)

FIG. 1 shows a ship 1 provided with a remote control device 31 as an operation device according to a first embodiment of the present invention. Arrows on a lower right side in FIG. 1 indicate front (Fd), rear (Bd), upper (Ud), lower (Dd), left (Ld) and right (Rd) directions of the ship 1.

As shown in FIG. 1, the ship 1 is provided with an outboard motor 11 as a ship propulsion machine that generates a propulsive force of the ship 1. The outboard motor 11 is attached to a rear portion of a hull 2 of the ship 1 by a clamp bracket 12. A console 3 is provided at a central portion of the hull 2 in a front-rear direction or at a portion closer to a front side than the central portion. An engine start button 4 and a steering wheel 5 are provided on an upper surface of the console 3. The engine start button 4 is a button for starting an engine of the outboard motor 11. The steering wheel 5 is a device that steers the ship 1. The console 3 is provided with a remote control device 31. The remote control device 31 is a device that is performed an operation related to the propulsive force of the ship 1 generated by the outboard motor 11. The remote control device 31 is attached to an upper portion of a right surface of the console 3. The remote control device 31 is attached such that an extending direction of an operation portion 42 of a lever 32 is a vertical direction when a rotation axis A of the lever 32 (see FIG. 5) is orthogonal to the right surface of the console 3 and the lever 32 is positioned at the neutral position N (see FIG. 4).

Figure 2:
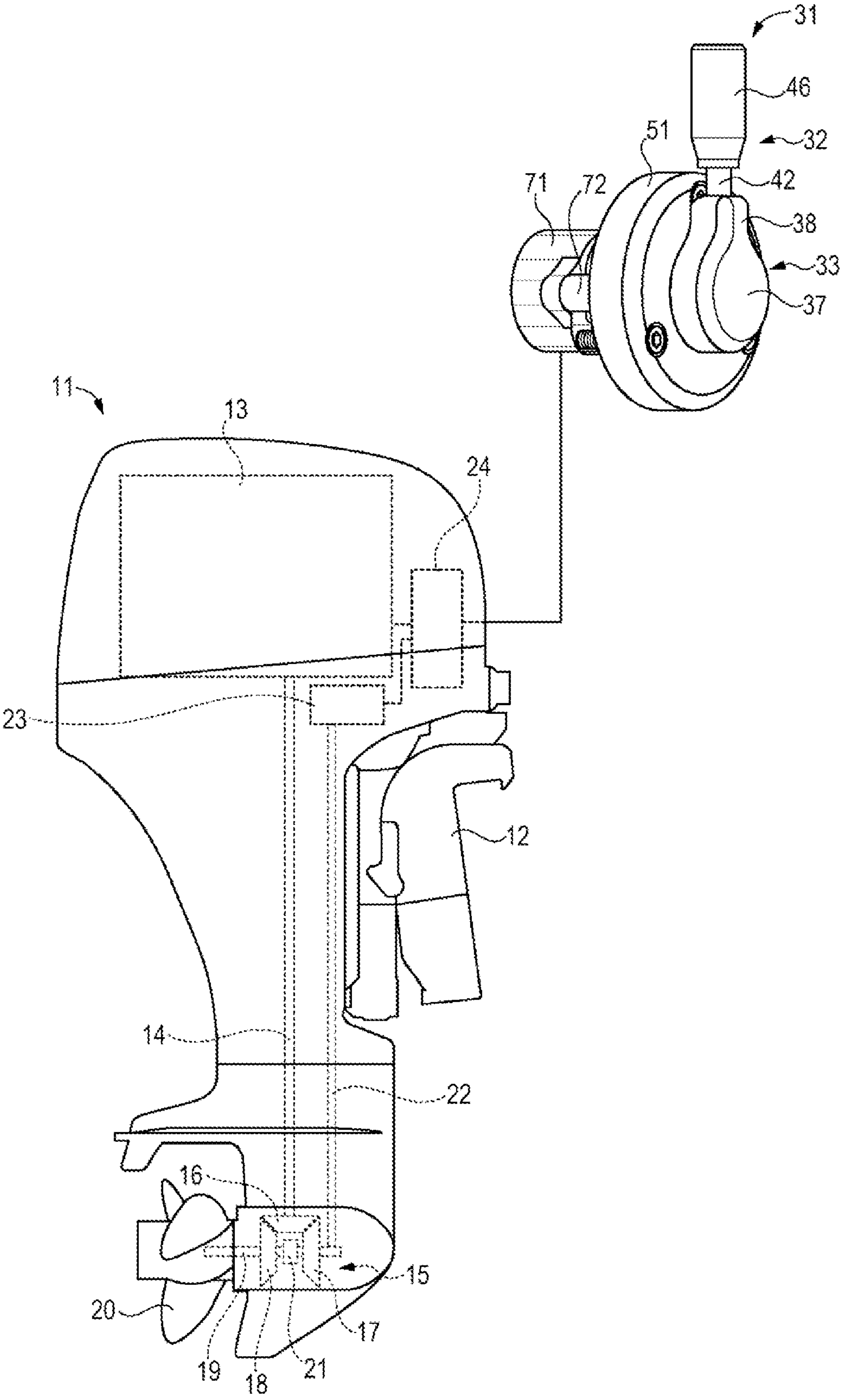
FIG. 2 is an explanatory view showing the remote control device and an outboard motor according to the first embodiment of the present invention.

FIG. 2 shows the remote control device 31 and the outboard motor 11. As shown in FIG. 2, the outboard motor 11 includes an engine 13 (internal combustion engine) as a power source, a drive shaft 14, a gear mechanism 15, a propeller shaft 19 and a propeller 20. The engine 13 is provided at an upper portion of the outboard motor 11. The drive shaft 14 extends in an upper-lower direction, and an upper end portion thereof is connected to a crankshaft of the engine 13. The propeller shaft 19 is provided at a lower portion of the outboard motor 11 and extends in the front-rear direction. The propeller 20 is fixed to a rear end side of the propeller shaft 19. The gear mechanism 15 is a mechanism that transmits rotation of the drive shaft 14 to the propeller shaft 19, and includes a drive gear 16, a forward gear 17 and a reverse gear 18. The drive gear 16, the forward gear 17 and the reverse gear 18 are all bevel gears. The drive gear 16 is fixed to a lower end portion of the drive shaft 14. The forward gear 17 and the reverse gear 18 mesh with the drive gear 16, respectively. The forward gear 17 rotates in one direction in response to the rotation of the drive gear 16. The reverse gear 18 rotates in a direction opposite to that of the forward gear 17 in response to the rotation of the drive gear 16.

The outboard motor 11 includes a clutch 21, a shift rod 22 and a shift actuator 23. The clutch 21 is a mechanism that selectively connects one of the forward gear 17 and the reverse gear 18 to the propeller shaft 19. When the forward gear 17 and the propeller shaft 19 are connected to each other during operation of the engine 13, the propeller 20 rotates in one direction to generate a propulsive force for moving the ship 1 forward (forward movement propulsive force). When the reverse gear 18 and the propeller shaft 19 are connected to each other during the operation of the engine 13, the propeller 20 rotates in a reverse direction to generate a propulsive force for moving the ship 1 backward (backward movement propulsive force). The clutch 21 can also create a stale in which neither the forward gear 17 nor the reverse gear 18 is connected to the propeller shaft 19. When neither the forward gear 17 nor the reverse gear 18 is connected to the propeller shaft 19 during the operation of the engine 13, a power of the engine 13 is not transmitted to the propeller shaft 19. Therefore, rotation of the propeller 20 stops, and the propulsive force of the ship 1 is no longer generated. The clutch 21 is connected to the shift actuator 23 via the shift rod 22. The shift actuator 23 is an actuator that controls an operation of the clutch 21. The shift actuator 23 operates the clutch 21 according to a control signal output from a control unit 24 to be described later.

The outboard motor 11 includes the control unit 24. The control unit 24 is a device that controls the engine 13 and other devices provided in the outboard motor 11. The control unit 24 includes an arithmetic processing unit, a storage device and the like. The engine start button 4, the remote control device 31 and the like are electrically connected to the control unit 24 via an electric wire. The control unit 24 starts the operation of the engine 13 when the engine start button 4 is pressed by the user while the engine 13 is stopped. In addition, the control unit 24 controls the clutch 21 according to an operation of the remote control device 31 by the user to switch gears in the gear mechanism 15. Further, the control unit 24 controls the engine 13 according to the operation of the remote control device 31 by the user to increase or decrease a rotation speed of the engine 13.

(Remote Control Device)

Figure 3:
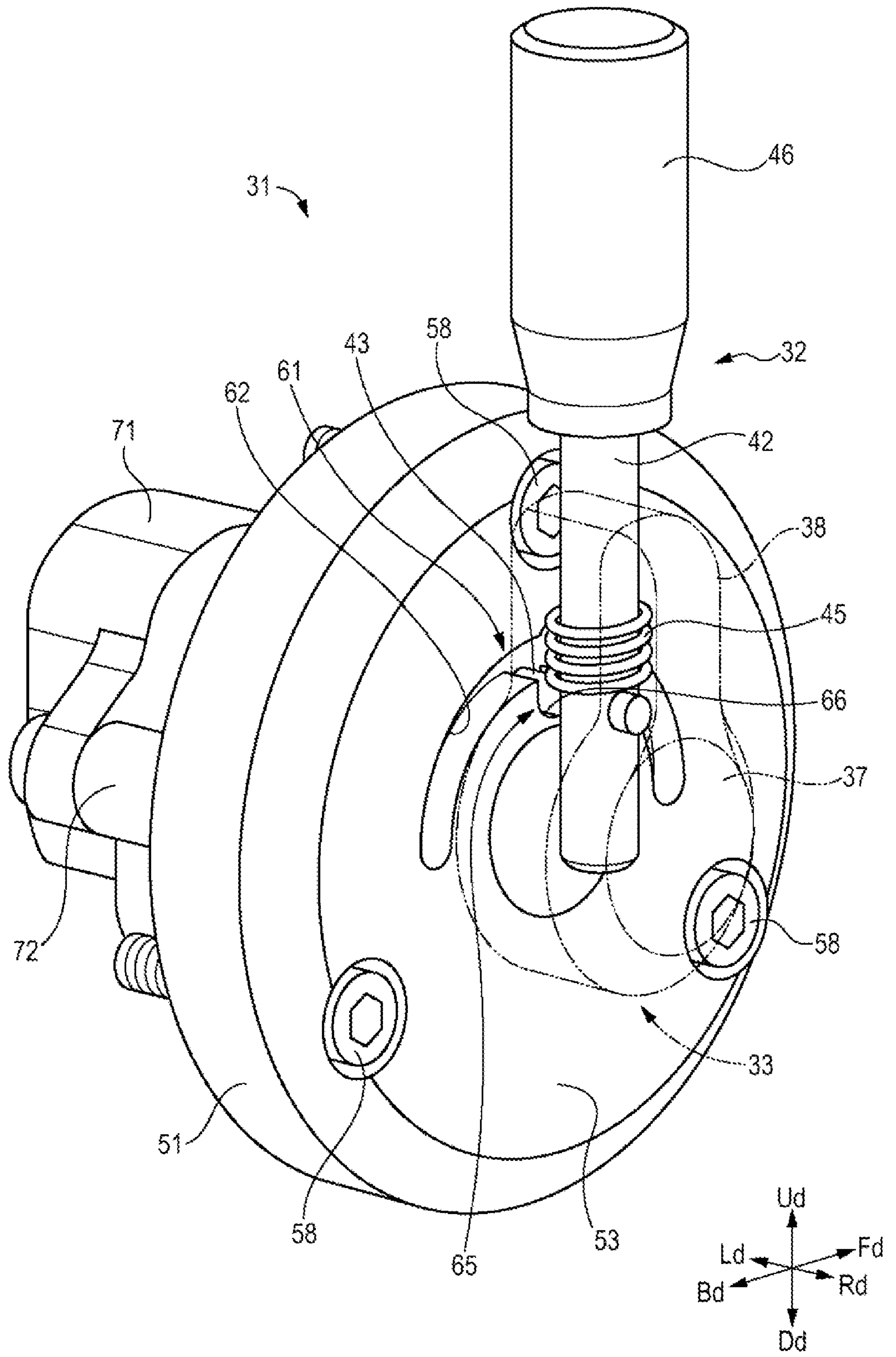
FIG. 3 is a perspective view showing the remote control device according to the first embodiment of the present invention.
Figure 4:
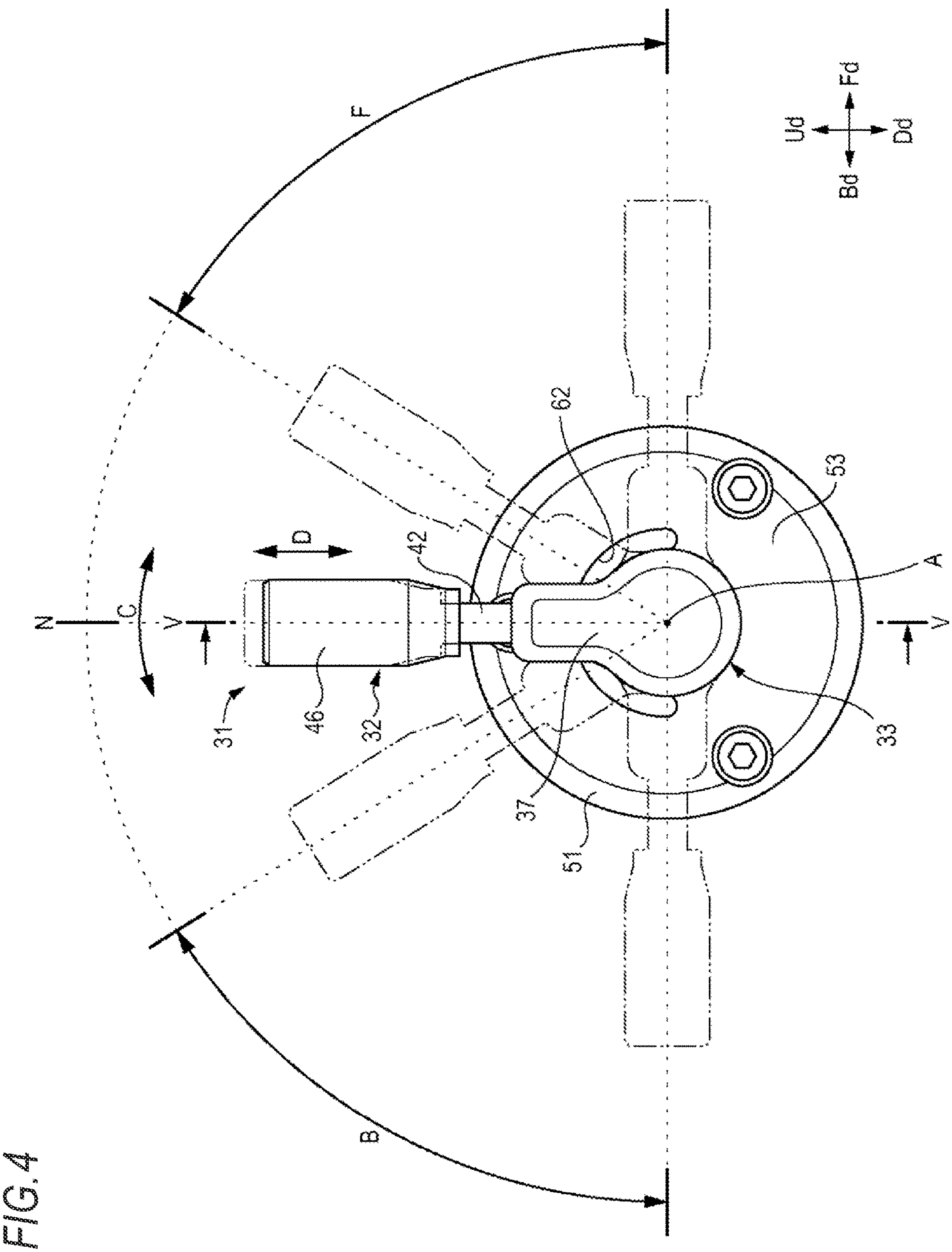
FIG. 4 is an explanatory view showing a state in which the remote control device according to the first embodiment of the present invention is viewed from a right side.
Figure 5:
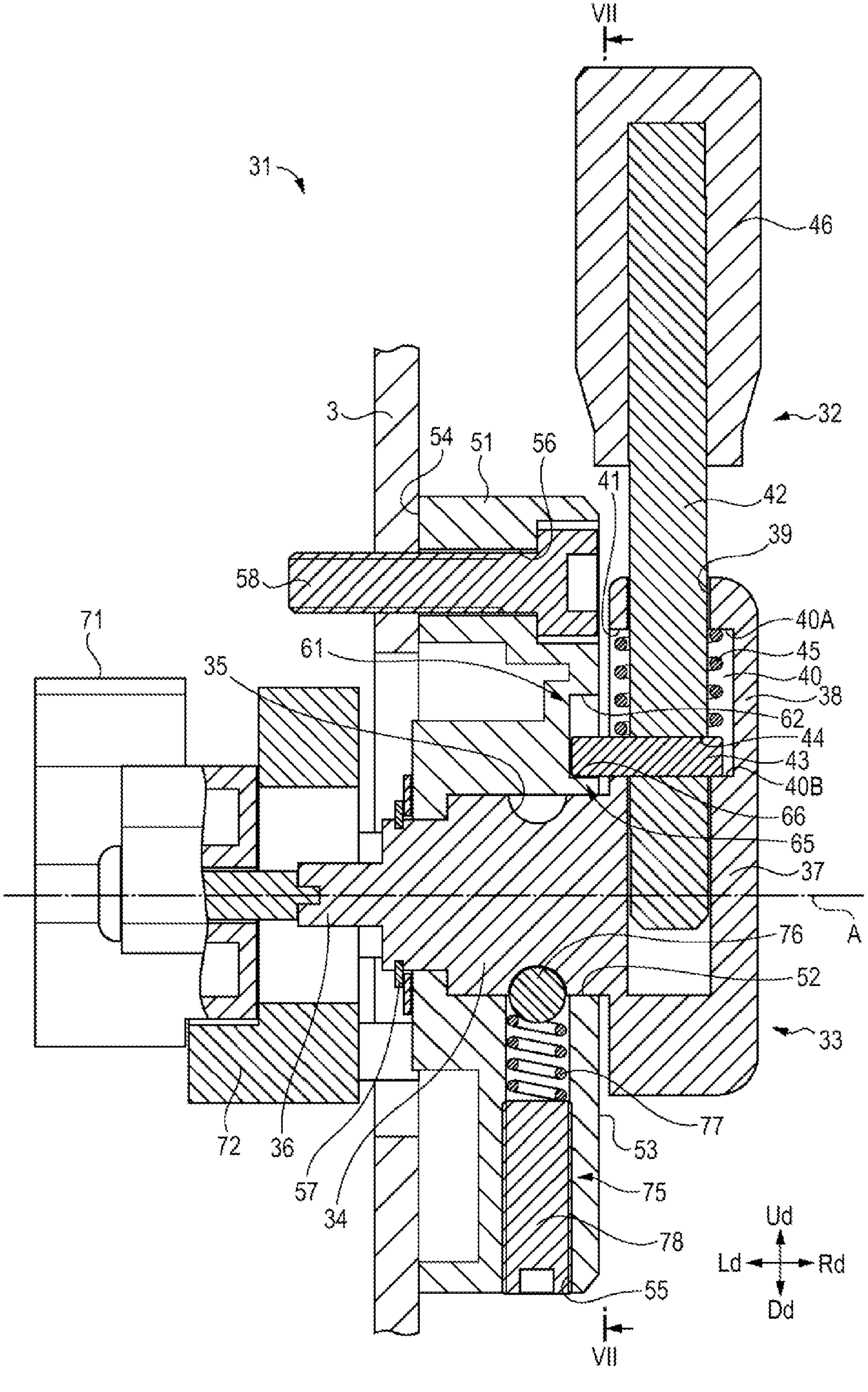
FIG. 5 is a cross-sectional view showing a state in which a cross section of the remote control device taken along a cutting line V-V in FIG. 4 is viewed from a left side in FIG. 4.

FIG. 3 shows a state in which the remote control device 31 is viewed from an upper right rear side. In FIG. 3, a base portion 33 of the lever 32 is indicated by a two-dot chain line, and a portion covered and hidden by the base portion 33 is shown by seeing through the base portion 33. FIG. 4 shows a state in which the remote control device 31 is viewed from a right side. FIG. 5 shows a state in which a cross section of the remote control device 31 taken along a cutting line V-V in FIG. 4 is viewed from a left side in FIG. 4. For convenience of description, in a state in which the remote control device 31 is attached to the right surface of the console 3 of the ship 1 as shown in FIG. 1, front, rear, upper, lower, left and right sides of the ship 1 are referred to as front, rear, upper, lower, left, and right sides of the remote control device 31. Arrows on a lower right side in FIGS. 3 to 10 indicate front (Fd), rear (Bd), upper (Ud), lower (Dd), left (Ld) and right (Rd) directions of the remote control device 31.

As shown in FIG. 3, the remote control device 31 includes the lever 32, a holder 51 that supports the lever 32, a rotation restriction mechanism 61 that restricts a rotation range of the lever 32, a lever bolding mechanism 65 that holds the lever 32 at the neutral position N, and a detection unit 71 that detects rotation of the lever 32.

The lever 32 is a portion that is performed an operation related to the propulsive force of the ship 1 generated by the outboard motor 11. As shown in FIG. 4, the lever 32 includes the base portion 33, the operation portion 42 and a grip 46. The entire lever 32 rotates about the rotation axis A in directions indicated by arrows C in FIG. 4 with respect to the holder 51. When the lever 32 is positioned at the neutral position N, the operation portion 42 of the lever 32 can move in the upper-lower direction with respect to the base portion 33 of the lever 32 as indicated by arrows D in FIG. 4.

The base portion 33 is formed of, for example, a metal material, and as shown in FIG. 5, includes a support shaft portion 34 that functions as a support shaft of the lever 32, and a connection portion 37 that connects the operation portion 42 to the base portion 33.

The support shaft portion 34 has a cylindrical outer shape whose axis is the rotation axis A extending in a left-right direction. An annular groove 35 into which a contact member 76 of a weight adjustment mechanism 75 to be described later is inserted is formed on an outer circumferential surface of the support shaft portion 34. The annular groove 35 is formed over the entire circumference of the support shaft portion 34. A connection shaft portion 36 that connects the lever 32 and the detection unit 71 is formed at a left end portion of the support shaft portion 34.

The connection portion 37 is positioned on a right end side of the support shaft portion 34, and is formed integrally with the support shaft portion 34. The connection portion 37 has a cylindrical outer shape coaxial with the support shaft portion 34, hut has a diameter larger than that of the support shaft portion 34. A protruding portion 38 that protrudes in a direction orthogonal to the rotation axis A (upward when the lever 32 is positioned al the neutral position N) is formed at a portion of the connection portion 37 on an outer circumferential side.

An insertion hole 39 into which the operation portion 42 is inserted is formed in the connection portion 37. The insertion hole 39 extends from a protruding-side end surface of the protruding portion 38 of the connection portion 37 in the direction orthogonal to the rotation axis A (the upper-lower direction when the lever 32 is positioned at the neutral position N). In the present embodiment, the insertion hole 39 extends from the protruding-side end surface of the protruding portion 38 to a position beyond the rotation axis A.

A spring accommodating portion 40 is formed inside the protruding portion 38 of the connection portion 37. The spring accommodating portion 40 is a space that is arranged coaxially with the insertion hole 39 and has a diameter larger than that of the insertion hole 39. A communication hole 41 is formed in a portion of a left portion of the protruding portion 38 of the connection portion 37 facing a right surface 53 of the holder 51. The communication hole 41 communicates with the insertion hole 39 and the spring accommodating portion 40. Thereby, the insertion hole 39 and the spring accommodating portion 40 are opened toward the holder 51.

The operation portion 42 is a rod-shaped member formed of, for example, a metal material, and extends in the direction orthogonal to the rotation axis A (the upper-lower direction when the lever 32 is positioned at the neutral position N). The operation portion 42 is connected to the base portion 33 so as to be movable in the extending direction of the operation portion 42 with respect to the base portion 33. That is, a base end side (a lower end side when the lever 32 is positioned at the neutral position N) of the operation portion 42 is inserted into the insertion hole 39 of the connection portion 37 of the base portion 33, and thus the operation portion 42 is connected to the base portion 33. A diameter dimension of the operation portion 42 is slightly smaller than a diameter dimension of the insertion hole 39. Therefore, the operation portion 42 can move in the extending direction of the operation portion 42 in the insertion hole 39.

In addition, a holding pin 43 is provided at a base end side portion of the operation portion 42. The holding pin 43 is formed of, for example, a metal material, and extends in a direction (left-right direction) orthogonal to the operation portion 42 and parallel to the rotation axis A. The holding pin 43 is fixed to the operation portion 42. Specifically, a pin fixing hole 44 penetrating the operation portion 42 in a radial direction thereof is formed in the base end side portion of the operation portion 42, and the holding pin 43 is press-fitted into the pin fixing hole 44. A screw may be formed on an inner circumferential surface of the pin fixing hole 44 and an outer circumferential surface of the holding pin 43, and the holding pin 43 may be screwed and fixed to the pin fixing hole 44. A length dimension of the holding pin 43 is larger than the diameter dimension of the operation portion 42. A left end side of the holding pin 43 protrudes leftward from an outer circumferential surface of the operation portion 42 toward the holder 51. The left end side of the holding pin 43 protrudes to outside of the connection portion 37 through the communication hole 41. On the other hand, a right end side of the holding pin 43 protrudes rightward from the outer circumferential surface of the operation portion 42. The holding pin 43 is a specific example of a protruding portion.

In the spring accommodating portion 40 of the connection portion 37 of the base portion 33, a holding spring 45 is provided as a biasing member that biases the operation portion 42 toward one side in the extending direction of the operation portion 42 with respect to the base portion 33, specifically, in a direction toward the rotation axis A. In the present embodiment, the holding spring 45 is a coil spring and is attached to an outer circumferential side of the operation portion 42. The holding spring 45 is provided in the spring accommodating portion 40 in a state of being elastically deformed and contracted. An end portion of the holding spring 45 on a side away from the rotation axis A is in contact with an inner surface 40A of the spring accommodating portion 40 on the side away from the rotation axis A. On the other hand, an end portion of the holding spring 45 on a side close to the rotation axis A is in contact with an outer circumferential surface of a portion of the holding pin 43 protruding from the operation portion 42. Thereby, the operation portion 42 is pressed by the holding spring 45 in the direction toward the rotation axis A. Although the operation portion 42 is pressed by the holding spring 45 in the direction toward the rotation axis A in this way, the outer circumferential surface of the portion of the holding pin 43 protruding from the operation portion 42 abuts against an inner surface 40B of the spring accommodating portion 40 on the side close to the rotation axis A, and thus movement of the operation portion 42 in the direction toward the rotation axis A is restricted.

The grip 46 is fixed to a tip end side of the operation portion 42 (an upper end side when the lever 32 is positioned at the neutral position N). The grip 46 is formed of, for example, a resin material. The grip 46 is a portion that the user grips by hand when operating the lever 32. The user can rotate the lever 32 with respect to the holder 51 by gripping and moving the grip 46 by hand. As will be described later, when the lever 32 is held by the lever holding mechanism 65 at the neutral position N so as not to be rotatable, the user can release the non-rotatable holding state of the lever 32 by gripping and moving the grip 46 by hand.

The holder 51 is formed of, for example, a metal material, and as shown in FIGS. 3 and 4, has a columnar or disk-shaped outer shape with the rotation axis A as an axis. A diameter dimension of the holder 51 is larger than a diameter dimension of the connection portion 37 of the base portion 33.

As shown in FIG. 5, the holder 51 has an insertion hole 52 through which the support shaft portion 34 of the base portion 33 of the lever 32 is inserted. The insertion hole 52 extends in a direction of the rotation axis A (left-right direction) and penetrates the holder 51. The insertion hole 52 has a circular cross-sectional shape, and a center of the insertion hole 52 coincides with the rotation axis A. The support shaft portion 34 of the base portion 33 of the lever 32 is inserted into the insertion hole 52, and is supported in the insertion hole 52 so as to be rotatable about the rotation axis A. A stopper 57 is provided at a left end portion of the support shaft portion 34 of the lever 32 to prevent the support shaft portion 34 from coming off into the insertion hole 52.

A left surface of the holder 51 serves as an attachment surface 54 for attaching the holder 51 to a ship or a component fixed to the ship. Since a surface of the holder 51 orthogonal to the rotation axis A is the attachment surface 54, the holder 51 can be attached to a surface (in the present embodiment, the right surface of the console 3) extending in the vertical direction (upper-lower and front-rear directions, or upper-lower and left-right directions), in the ship or the component provided in the ship, such that the rotation axis A is orthogonal to the surface.

The holder 51 has an attachment hole 55 for attaching the contact member 76, a pressing spring 77 and an adjustment bolt 78 of the weight adjustment mechanism 75. The attachment hole 55 extends in a radial direction of the holder 51, and one end side of the attachment hole 55 is opened in an inner surface of the insertion hole 52, and the other end side of the attachment hole 55 is opened in an outer circumferential surface of the holder 51. The holder 51 is fixed to the right surface of the console 3 using, for example, three fixing members 58 (for example, bolts). Three fixing member insertion holes 56 for inserting, for example, the three fixing members 58 are formed in an outer circumferential portion of the holder 51.

Figure 6:
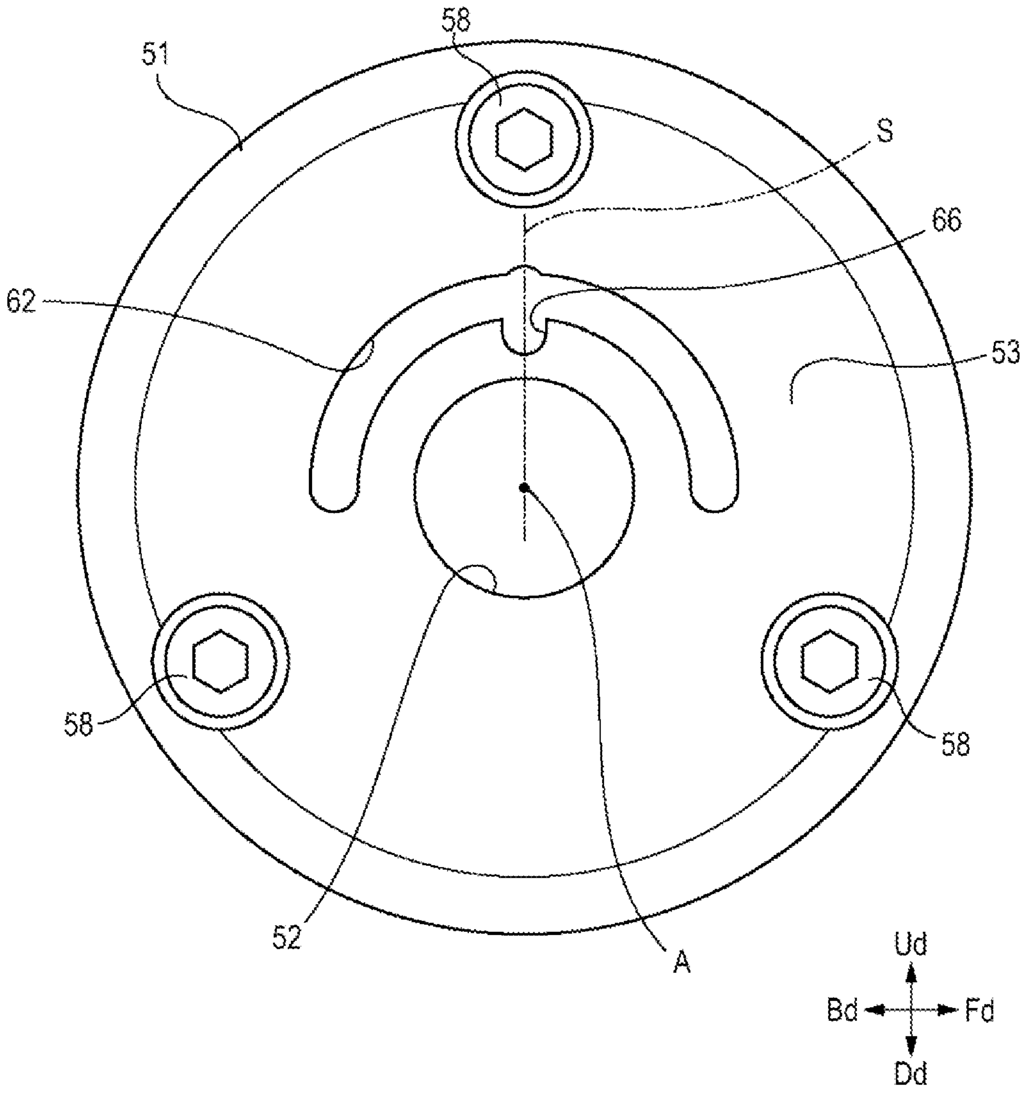
FIG. 6 is an explanatory view showing a state in which a holder in the remote control device according to the first embodiment of the present invention is viewed from the right side.

The rotation restriction mechanism 61 includes the holding pin 43 fixed to the operation portion 42 and a rotation restriction groove 62 formed in the holder 51. The rotation restriction groove 62 is a groove formed in a surface of the holder 51 facing the operation portion 42, that is, the right surface 53 of the holder 51. FIG. 6 shows the holder 51 as viewed from the right side. As shown in FIG. 6, the rotation restriction groove 62 extends in a rotation direction of the lever 32. The rotation restriction groove 62 is formed in an arc shape having a central angle of, for example, 180 degrees around the rotation axis A. The rotation restriction groove 62 is arranged outside the insertion hole 52 in an upper half region of the right surface 53 of the holder 51. As can be seen from FIG. 3, a left end portion of the holding pin 43 is inserted into the rotation restriction groove 62. Thereby, a movement range of the holding pin 43 is restricted by the rotation restriction groove 62, and as a result, the rotation range of the lever 32 is restricted.

As shown in FIG. 4, the rotation restriction mechanism 61 restricts the rotation range of the lever 32 with respect to the holder 51 to a predetermined rotation range including a forward movement operation range F in which an operation of increasing or decreasing a forward movement propulsive force of the ship 1 is performed, a backward movement operation range B in which an operation of increasing or decreasing a backward movement propulsive force of the ship 1 is performed, and the neutral position N at which a propulsive force of the ship 1 is not generated. For example, in the rotation range of the lever 32, the neutral position N is set between the forward movement operation range F and the backward movement operation range B. The forward movement operation range F is set to a range from about 30 degrees to 90 degrees in a clockwise direction from the neutral position N. The backward movement operation range B is set to a range from about 30 degrees to 90 degrees in a counterclockwise direction from the neutral position N. A central angle of the rotation restriction groove 62 is set such that the rotation range of the lever 32 with respect to the holder 51 is restricted to such a predetermined rotation range.

The neutral position N, the forward movement operation range F and the backward movement operation range B are not limited to those shown in FIG. 4. For example, the forward movement operation range F may be set to a range from about 30 degrees to 90 degrees in the counterclockwise direction from the neutral position N, and the backward movement operation range B may be set to a range from about 30 degrees to 90 degrees in the clockwise direction from the neutral position N. A start angle of the forward movement operation range F or the backward movement operation range B may be set to be smaller than 30 degrees or larger than 30 degrees from the neutral position N. An end angle of the forward movement operation range F or the backward movement operation range B may be set to be smaller than 90 degrees or larger than 90 degrees from the neutral position N. The rotation restriction groove 62 can be changed to a rotation restriction hole penetrating the holder 51 in the left-right direction. The rotation restriction groove 62 is a specific example of a rotation restriction portion.

The lever holding mechanism 65 includes the holding pin 43 fixed to the operation portion 42 and a lever holding groove 66 formed in the holder 51. As shown in FIG. 6, the lever holding groove 66 is a groove formed in the right surface 53 of the holder 51. The lever holding groove 66 extends in parallel to a straight line S that passes through the neutral position N and is orthogonal to the rotation axis A. When the holder 51 is viewed from the right side, the lever holding groove 66 overlaps the straight line S.

The lever holding groove 66 extends in the upper-lower direction, and an upper end portion of the lever holding groove 66 is connected to the rotation restriction groove 62. That is, the upper end portion of the lever holding groove 66 intersects with a portion of the rotation restriction groove 62 positioned at the neutral position N, and the lever holding groove 66 extends downward from the position. The lever holding groove 66 is continuous with the rotation restriction groove 62. A depth of the lever holding groove 66 is the same as a depth of the rotation restriction groove 62, and there is no step between a bottom surface of the lever holding groove 66 and a bottom surface of the rotation restriction groove 62. The lever holding groove 66 is positioned above the insertion hole 52, and a lower end portion of the lever holding groove 66 is close to the insertion hole 52. A length of the lever holding groove 66 in the upper-lower direction is longer than a radius of the holding pin 43, and is substantially equal to a diameter of the holding pin 43, for example. The lever holding groove 66 is a specific example of a lever holding portion.

Figure 7A:
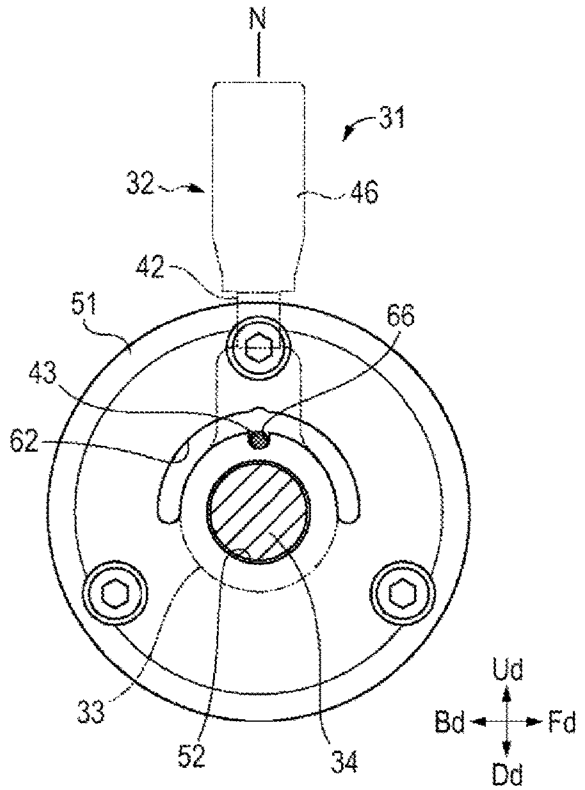
FIGS. 7A, 7B, and 7C are explanatory views showing operations of a rotation restriction mechanism and a lever holding mechanism in the remote control device according to the first embodiment of the present invention.

The lever holding mechanism 65 holds the lever 32 at the neutral position N so as not to be rotatable when the lever 32 is at the neutral position N and the operation portion 42 moves toward the one side in the extending direction of the operation portion 42 with respect to the base portion 33, that is, in the direction toward the rotation axis A (specifically, downward). FIG. 7A shows a state in which a cross section of the remote control device 31 taken along a cutting line VII-VII in FIG. 5 is viewed from the right side in FIG. 5. As shown in FIG. 7A, when the lever 32 is positioned at the neutral position N, the operation portion 42 is pressed downward by a biasing force of the holding spring 45 and moves downward with respect to the base portion 33. Thereby, the left end portion of the holding pin 43 enters the lever holding groove 66 and moves to a lower end portion in the lever holding groove 66. In this way, the left end portion of the holding pin 43 enters the lever holding groove

66 and moves to the lower end portion in the lever holding groove 66, so that the lever 32 is held at the neutral position N so as not to be rotatable.

Since the operation portion 42 is biased by the holding spring 45 in the direction toward the rotation axis A, when the user rotates the lever 32 to the neutral position N, the operation portion 42 automatically moves downward by the biasing force of the holding spring 45, and the holding pin 43 automatically enters the lever holding groove 66. The user does not need to push the grip 46 downward to insert the holding pin 43 into the lever holding groove 66.

Since the operation portion 42 (holding pin 43) is biased by the holding spring 45 in the direction toward the rotation axis A, when the lever 32 is positioned at the neutral position N, the operation portion 42 moves downward and the holding pin 43 is maintained in the lever holding groove 66, and the lever 32 is maintained in the non-rotatable holding state. Thereby, the holding pin 43 can be prevented from coming out of the lever holding groove 66 due to vibration applied to the remote control device 31, and the non-rotatable holding state of the lever 32 by the lever holding mechanism 65 can be prevented from being released against an intention of the user.

Since the length of the lever holding groove 66 in the upper-lower direction is longer than the radius of the holding pin 43, when the left end portion of the holding pin 43 enters the lever holding groove 66 and moves to the lower end portion in the lever holding groove 66, the lever 32 is brought into a non-rotatable state. That is, even if the user grips the grip 46 and pushes the lever 32 in the clockwise direction or pulls the lever 32 in the counterclockwise direction, the holding pin 43 abuts against an inner surface (front surface or rear surface) of the lever holding groove 66 and the lever 32 does not rotate.

Figure 7B:
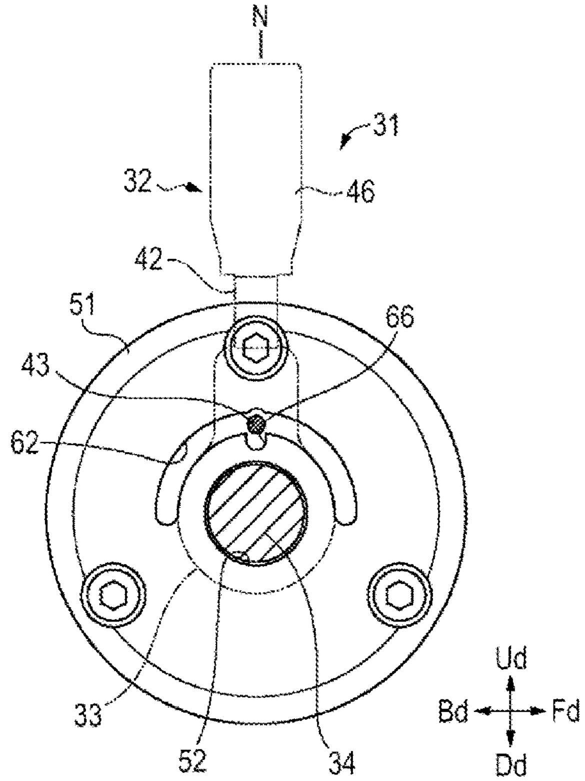
Figure 7C:
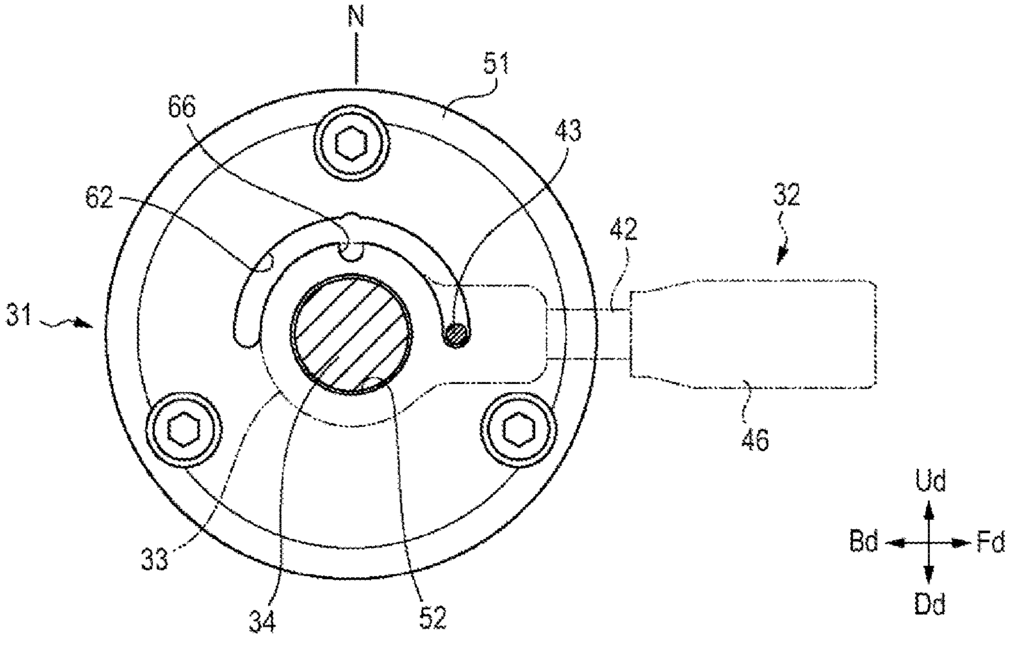

On the other hand, a state in which the lever 32 is held by the lever holding mechanism 65 at the neutral position N so as not to be rotatable is released by the operation portion 42 moving toward the other side in the extending direction of the operation portion 42 with respect to the base portion 33, that is, in a direction away from the rotation axis A (specifically, upward). FIG. 7B shows a state in which the operation portion 42 has moved upward. In the state in which the lever 32 is held by the lever holding mechanism 65 at the neutral position N, when the user grips the grip 46 and pulls the operation portion 42 upward against the biasing force of the holding spring 45, the operation portion 42 moves upward with respect to the base portion 33, and the left end portion of the holding pin 43 comes out of the lever holding groove 66. Thereby, the non-rotatable holding state of the lever 32 is released, and the lever 32 is rotatable from the neutral position N. FIG. 7C shows a state in which the lever 32 is rotated by 90 degrees in the clockwise direction from the neutral position N and is positioned at an end position of the forward movement operation range F.

The detection unit 71 is, for example, an angle sensor, and is attached to a left portion of the holder 51 via an attachment member 72 as shown in FIG. 3. As shown in FIG. 5, the connection shaft portion 36 formed on the support shaft portion 34 of the base portion 33 of the lever 32 is connected to the detection unit 71, whereby rotation of the lever 32 is input to the detection unit 71. As shown in FIG. 2, the detection unit 71 is electrically connected to the control unit 24 of the outboard motor 11 via an electric wire. The detection unit 71 outputs, for example, a detection signal indicating a rotation direction and a rotation angle (rotation amount) of the lever 32 to the control unit 24.

The remote control device 31 is provided with the weight adjustment mechanism 75 that adjusts a weight of the lever 32 when the lever 32 is rotated. As shown in FIG. 5, the weight adjustment mechanism 75 includes the contact member 76, which is formed of, for example, a metal material in a spherical shape, the pressing spring 77, and the adjustment bolt 78. The contact member 76, the pressing spring 77 and the adjustment bolt 78 are inserted into the attachment hole 55 of the holder 51, and are arranged in this order from a center side toward an outer circumferential side in the radial direction of the holder 51. The contact member 76 is in contact with an inner surface of the annular groove 35 of the support shaft portion 34. A screw is formed on an inner surface of a portion of the attachment hole 55 positioned on an outer circumferential side of the holder 51, and the adjustment bolt 78 is screwed into the attachment hole 55. The adjustment bolt 78 presses the pressing spring 77 toward the center side of the holder 51, and the pressing spring 77 presses the contact member 76 toward the center side of the holder 51. Thereby, the contact member 76 is pressed against the inner surface of the annular groove 35 by the biasing force of the pressing spring 77. By such contact between the contact member 76 and the inner surface of the annular groove 35, a frictional force that prevents the rotation of the lever 32 with respect to the holder 51 is generated. The user can change a strength of the frictional force applied to the lever 32 by changing a screwing amount of the adjustment bolt 78 into the attachment hole 55, and can adjust the weight of the lever 32 when the lever 32 is rotated.

An operation of the remote control device 31 and an operation of the outboard motor 11 based on the operation of the remote control device 31 are as follows.

When the user presses the engine start button 4 in a state in which the lever 32 of the remote control device 31 is positioned at the neutral position N and the lever 32 is held by the lever holding mechanism 65 so as not to be rotatable, the engine 13 of the outboard motor 11 starts to operate under control of the control unit 24 of the outboard motor 11. When the engine 13 operates, the drive shaft 14 is rotated by the power of the engine 13, and the drive gear 16, the forward gear 17 and the reverse gear 18 are rotated accordingly. However, when the lever 32 is positioned at the neutral position N, neither the forward gear 17 nor the reverse gear 18 is connected to the propeller shaft 19, so that the power of the engine 13 is not transmitted to the propeller shaft 19. Therefore, the propeller 20 does not rotate, and the propulsive force of the ship 1 is not generated. Therefore, the ship 1 is maintained in a stopped state. At this time, the lever 32 of the remote control device 31 is held by the lever holding mechanism 65 so as not to be rotatable. Therefore, the lever 32 can be prevented from rotating from the neutral position N against the intention of the user. For example, it is possible to prevent a part of a body of the user or some object from hitting the lever 32 and causing the lever 32 to rotate from the neutral position N against the intention of the user and the ship 1 to move forward or backward.

When the ship 1 is to be moved forward in a state in which the lever 32 is held by the lever holding mechanism 65 at the neutral position N so as not to be rotatable and the ship 1 is stopped, the user grips the grip 46 to push the grip 46 forward while pulling the grip 46 upward. When the grip 46 is pulled upward, the operation portion 42 moves upward with respect to the base portion 33, and the holding pin 43 comes out of the lever holding groove 66. Thereby, the non-rotatable holding state of the lever 32 by the lever holding mechanism 65 is released. When the grip 46 is pushed forward, the holding pin 43 moves forward in the rotation restriction groove 62, and the lever 32 rotates forward (clockwise in FIG. 4).

As shown in FIG. 4, when the rotation angle of the lever 32 in the clockwise direction from the neutral position N becomes about 30 degrees or greater and a position of the lever 32 enters the forward movement operation range F, the control unit 24 of the outboard motor 11 operates the clutch 21 via the shift actuator 23 and the shift rod 22 based on the detection signal output from the detection unit 71 to connect the forward gear 17 and the propeller shaft 19. Thereby, the power of the engine 13 is transmitted to the propeller shaft 19 via the forward gear 17, the propeller 20 rotates in one direction, and the forward movement propulsive force of the ship 1 is generated. Therefore, the ship 1 moves forward.

The user can change a forward movement speed of the ship 1 by changing the rotation angle of the lever 32 within the forward movement operation range F. That is, when the user increases the rotation angle of the lever 32 in the clockwise direction within the forward movement operation range F, the control unit 24 increases the rotation speed of the engine 13 based on the detection signal output from the detection unit 71. Thereby, the rotation speed of the propeller 20 increases, the forward movement propulsive force of the ship 1 increases, and a speed at which the ship 1 moves forward increases. When the user reduces the rotation angle of the lever 32 in the clockwise direction within the forward movement operation range F, the speed at which the ship 1 moves forward is reduced by the same control.

On the other hand, when the ship 1 is to be moved backward in the state in which the lever 32 is held by the lever holding mechanism 65 at the neutral position N so as not to be rotatable and the ship 1 is stopped, the user grips the grip 46 to pull the grip 46 rearward while pulling the grip 46 upward. Thereby, the non-rotatable holding state of the lever 32 by the lever holding mechanism 65 is released, and the lever 32 rotates rearward (counterclockwise in FIG. 4).

When the rotation angle of the lever 32 in the counterclockwise direction from the neutral position N becomes about 30 degrees or greater and the position of the lever 32 enters the backward movement operation range B, the control unit 24 of the outboard motor 11 operates the clutch 21 to connect the reverse gear 18 and the propeller shaft 19. Thereby, the power of the engine 13 is transmitted to the propeller shaft 19 via the reverse gear 18, the propeller 20 rotates in the reverse direction, and the backward movement propulsive force of the ship 1 is generated. Therefore, the ship 1 moves backward.

The user can change a backward movement speed of the ship 1 by changing the rotation angle of the lever 32 within the backward movement operation range B. Control for changing the backward movement speed of the ship 1 is the same as the control for changing the forward movement speed of the ship 1. When the user increases the rotation angle of the lever 32 in the counterclockwise direction within the backward movement operation range B, a speed at which the ship 1 moves backward increases. When the user reduces the rotation angle of the lever 32 in the counterclockwise direction within the backward movement operation range B, the speed at which the ship 1 moves backward is reduced.

In a case where the ship 1 is stopped while the engine 13 is being operated after the ship 1 is moved forward or backward, the user grips the grip 46 and rotates the lever 32 to the neutral position N. When the lever 32 reaches the neutral position N, the holding pin 43 in the rotation restriction groove 62 reaches above the lever holding groove 66. At this time, the holding pin 43 moves downward together with the operation portion 42 by the biasing force of the holding spring 45, the holding pin 43 enters the lever holding groove 66, and the lever 32 is held by the lever holding mechanism 65 so as not to be rotatable. When the lever 32 moves out of the forward movement operation range F in a process of rotating from the forward movement operation range F toward the neutral position N, or when the lever 32 moves out of the backward movement operation range B in a process of rotating from backward movement operation range B toward the neutral position N, the control unit 24 controls the clutch 21 based on the detection signal output from the detection unit 71, so that neither the forward gear 17 nor the reverse gear 18 is connected to the propeller shaft 19. Thereby, the power of the engine 13 is not transmitted to the propeller shaft 19, so that the rotation of the propeller 20 stops. Therefore, although the engine 13 is operating, the propulsive force of the ship 1 is not generated, and the ship 1 stops.

As described above, in the remote control device 31 according to the first embodiment of the present invention, the lever 32 includes the operation portion 42 and the base portion 33, and the operation portion 42 is connected to the base portion 33 so as to be movable in the extending direction of the operation portion 42. When the lever 32 is positioned at the neutral position N and the operation portion 42 moves downward with respect to the base portion 33, the lever holding mechanism 65 holds the lever 32 at the neutral position N so as not to be rotatable. When the operation portion 42 of the lever 32 positioned at the neutral position N moves upward with respect to the base portion 33, the lever holding mechanism 65 releases the non-rotatable holding state of the lever 32 and brings the lever 32 into a rotatable state from the neutral position N. According to this configuration, in the state in which the lever 32 is held by the lever holding mechanism 65 at the neutral position N so as not to be rotatable, the user can release the non-rotatable holding state of the lever 32 by the lever holding mechanism 65 by gripping the grip 46 of the lever 32 and pulling the operation portion 42 upward. An operation of gripping the grip 46 and pulling the operation portion 42 upward can be easily performed, for example, even when the user faces sideways or obliquely backward and a steering posture is out of order. In addition, the operation of gripping the grip 46 and pulling the operation portion 42 upward can be easily performed even when a finger cannot be moved as intended since the hand is numb or some finger is injured. Therefore, even when the steering posture is out of order or even when the finger cannot be moved as intended, the user can easily release the state in which the lever 32 is held at the neutral position N so as not to be rotatable. In this way, according to the remote control device 31 according to the first embodiment of the present invention, ease of an operation of releasing the non-rotatable holding state of the lever 32 can be enhanced.

The remote control device 31 according to the first embodiment of the present invention is provided with the holding spring 45 that biases the operation portion 42 in the direction toward the rotation axis A with respect to the base portion 33. When the user rotates the lever 32 to the neutral position N, the operation portion 42 automatically moves downward by the holding spring 45, and the lever 32 is held by the lever holding mechanism 65 so as not to be rotatable. With this configuration, ease of an operation of holding the lever 32 at the neutral position N so as not to be rotatable can be enhanced. That is, the user only needs to rotate the lever 32 to the neutral position N in order to hold the lever 32 to the neutral position N so as not to be rotatable.

The remote control device 31 according to the first embodiment of the present invention has a configuration in which the holding pin 43 is fixed to the operation portion 42, the lever holding groove 66 is formed in the holder 51, and an end portion of the holding pin 43 is inserted into the lever holding groove 66, whereby the lever 32 is held at the neutral position N so as not to be rotatable. According to this configuration, the remote control device 31 that can hold the lever 32 at the neutral position N so as not to be rotatable and can easily release the non-rotatable holding state of the lever 32 can be realized with a simple structure, and the remote control device 31 can be reduced in size, weight and cost.

The remote control device 31 according to the first embodiment of the present invention includes the weight adjustment mechanism 75 that adjusts the weight of the lever 32 when the lever 32 is rotated. The weight of the lever 32 can be set by the weight adjustment mechanism 75 according to a preference of each user.

In the remote control device 31 according to the first embodiment of the present invention, the left surface of the holder 51 is the attachment surface 54. Thereby, the holder 51 can be attached to a surface extending in the vertical direction, in the ship and a component provided in the ship, such that the rotation axis A is orthogonal to the surface. In the present embodiment, a case where the holder 51 is attached to the right surface of the console 3 has been described as an example, but the holder 51 may be attached to, for example, an inner surface of the hull 2 of the ship 1 at a position close to an operator's seat.

Second Embodiment

Figure 8:
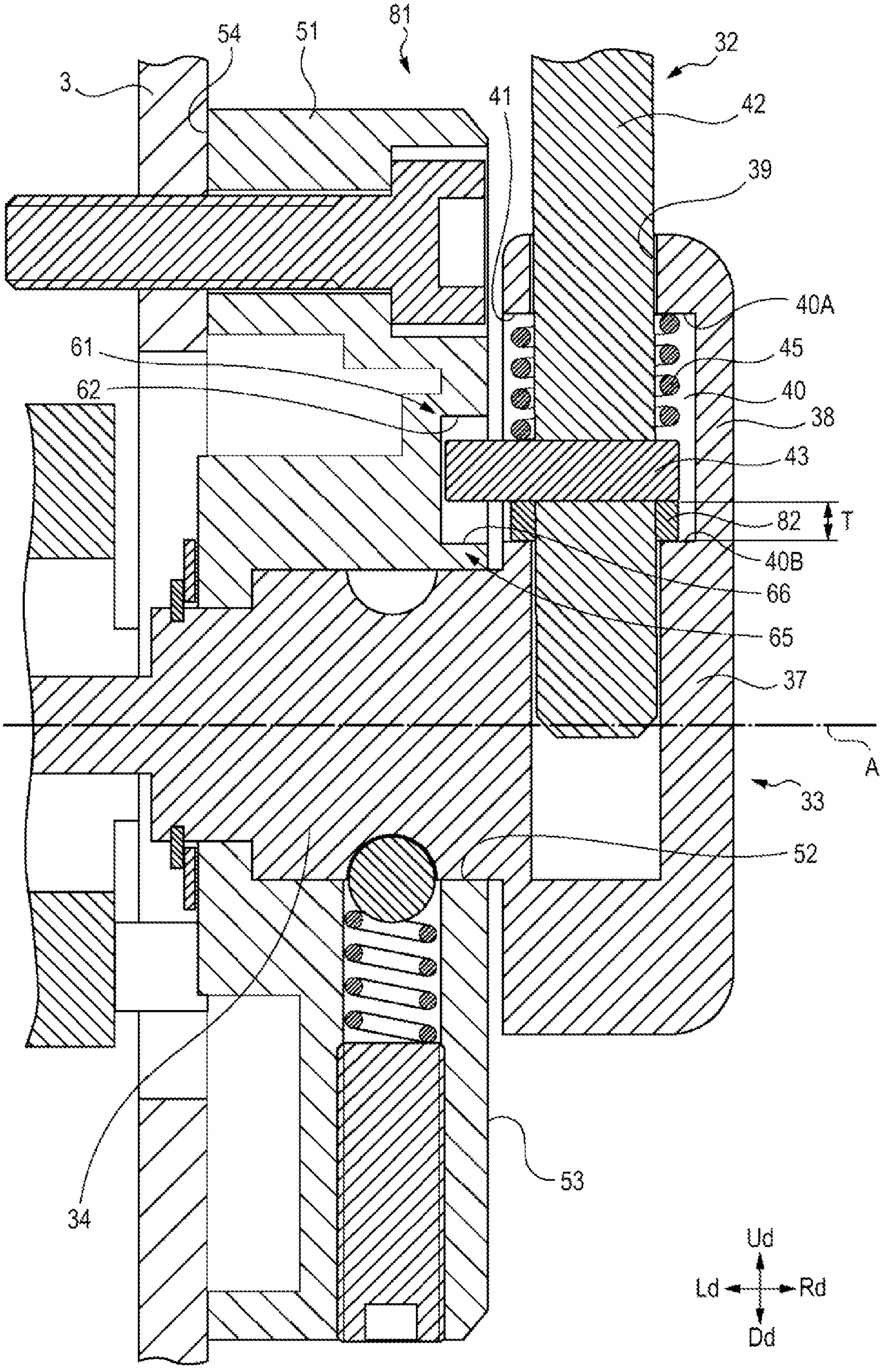
FIG. 8 is a cross-sectional view showing a remote control device according to a second embodiment of the present invention.

FIG. 8 shows the holder 51, the lever 32, the rotation restriction mechanism 61 and the lever holding mechanism 65 of a remote control device 81 according to a second embodiment of the present invention. A position (cutting position) of a cross section of the remote control device 81 in FIG. 8 is the same as a position of the cross section of the remote control device 31 in FIG. 5. In the remote control device 81 according to the second embodiment shown in FIG. 8, the same components as those of the remote control device 31 according to the first embodiment are denoted by the same reference numerals.

As shown in FIG. 8, the lever 32 of the remote control device 81 according to the second embodiment is provided with a movement restriction member 82 that restricts movement of the operation portion 42 with respect to the base portion 33 toward one side in the extending direction of the operation portion 42, specifically, in a direction toward the rotation axis A. Except for this point, a configuration of the remote control device 81 according to the second embodiment is the same as that of the remote control device 31 according to the first embodiment.

The movement restriction member 82 has a function of preventing the operation portion 42 from moving in the direction toward the rotation axis A with respect to the base portion 33, or reducing an amount of movement of the operation portion 42 in the direction toward the rotation axis A with respect to the base portion 33, thereby preventing the lever 32 from being held so that the lever 32 is not rotatable by the lever holding mechanism 65 at the neutral position N when the lever 32 is positioned at the neutral position N.

The movement restriction member 82 is an annular, tubular or C-shaped member formed of, for example, a metal material or a resin material. For example, a washer may be used as the movement restriction member 82. The movement restriction member 82 is arranged below the holding pin 43 and is attached to an outer circumferential side of the operation portion 42. An end surface of the movement restriction member 82 on a side away from the rotation axis A is in contact with an outer circumferential surface of a portion of the holding pin 43 protruding from the operation portion 42. An end surface of the movement restriction member 82 on a side close to the rotation axis A is in contact with the inner surface 40B of the spring accommodating portion 40 on the side close to the rotation axis A. T in FIG. 8 indicates a thickness of the movement restriction member 82.

In comparison between a case where the movement restriction member 82 is not attached to the operation portion 42 as shown in FIG. 5 and a case where the movement restriction member 82 is attached to the operation portion 42 as shown in FIG. 8, a position of the operation portion 42 when the operation portion 42 moves to the maximum in the direction toward the rotation axis A in the case where the movement restriction member 82 is attached to the operation portion 42 is more distant from the rotation axis A than in the case where the movement restriction member 82 is not attached to the operation portion 42. Therefore, when the lever 32 is positioned at the neutral position N due to the movement restriction member 82 being attached to the operation portion 42, downward movement of the lever 32 is blocked and the lever 32 does not move downward at all, or an amount of movement of the lever 32 that moves downward is reduced as compared with the case where the movement restriction member 82 is not attached to the operation portion 42.

When the lever 32 is positioned at the neutral position N due to the movement restriction member 82 being attached to the operation portion 42, whether the lever 32 does not move downward at all or whether the amount of movement of the lever 32 that moves downward is reduced as compared with the case where the movement restriction member 82 is not attached to the operation portion 42, is determined by the thickness T of the movement restriction member 82. Specifically, the thickness T of the movement restriction member 82, which is set such that the lever 32 does not move downward at all when the lever 32 is positioned at the neutral position N, is larger than the thickness T of the movement restriction member 82, which is set such that the amount of movement of the lever 32 that moves downward when the lever 32 is positioned at the neutral position N is reduced as compared with the case where the movement restriction member 82 is not attached to the operation portion 42.

In a case where the lever 32 is set so as not to move downward at all when the lever 32 is positioned at the neutral position N due to the movement restriction member 82 being attached to the operation portion 42, the holding pin 43 does not enter the lever holding groove 66 at all when the lever 32 is positioned at the neutral position N. As a result, the lever 32 is not held at all by the lever holding mechanism 65, and a function of the lever holding mechanism 65 is disabled.

When the lever 32 is positioned at the neutral position N due to the movement restriction member 82 being attached to the operation portion 42, the amount of movement of the lever 32 that moves downward is set to be reduced as compared with the case where the movement restriction member 82 is not attached to the operation portion 42. In this case, an amount by which the holding pin 43 enters the lever holding groove 66 when the lever 32 is positioned at the neutral position N is reduced as compared with the case where the movement restriction member 82 is not attached to the operation portion 42. By adjusting the thickness T of the movement restriction member 82 and setting the amount by which the holding pin 43 enters the lever holding groove 66 when the lever 32 is positioned at the neutral position N to be smaller than a radius of the holding pin 43, the lever holding mechanism 65 functions as a detent mechanism.

In a case where the lever holding mechanism 65 is set to function as the detent mechanism, when the lever 32 reaches the neutral position while the user rotates the lever 32, a left end portion of the holding pin 43 enters the lever holding groove 66, and thus rotation of the lever 32 stops at the neutral position N. However, since only a lower portion of the left end portion of the holding pin 43 enters the lever holding groove 66, the lever 32 is not held at the neutral position N so as not to be rotatable. When the user pushes the lever 32 stopped at the neutral position N forward or pulls the lever 32 rearward, the left end portion of the holding pin 43 comes out of the lever holding groove 66, so that the user can easily rotate the lever 32 stopped at the neutral position N. In order to rotate the lever 32 stopped at the neutral position N, it is not necessary to perform an operation of pulling the operation portion 42 upward with respect to the base portion 33.

According to the remote control device 81 according to the second embodiment of the present invention, by attaching the movement restriction member 82 to the operation portion 42 of the remote control device 31 according to the first embodiment of the present invention, the function of the lever holding mechanism 65 of holding the lever 32 at the neutral position N so as not to be rotatable can be disabled, or the function of the lever holding mechanism 65 can be changed such that the lever holding mechanism 65 functions as the detent mechanism. The remote control device 81 according to the second embodiment in which the function of the lever holding mechanism 65 is disabled or changed as described above can be manufactured only by adding the movement restriction member 82 to a component of the remote control device 31 according to the first embodiment and adding a process of attaching the movement restriction member 82 to the operation portion 42 to a manufacturing process of the remote control device 31 according to the first embodiment. Therefore, according to the remote control devices 31, 81 according to the first and second embodiments of the present invention, the remote control device 31 having the function of holding the lever 32 at the neutral position N so as not to be rotatable and the remote control device 81 not having the function of holding the lever 32 at the neutral position N so as not to be rotatable can be manufactured by a substantially common manufacturing process using a substantially common component.

In markets of ships, ship propulsion machines, or devices related thereto, there is a market that requires a function of holding a lever of a remote control device so as not to easily rotate from a neutral position when the lever is positioned at the neutral position, and a market that does not require such a function. The remote control device 31 according to the first embodiment is adapted to the market that requires the function of holding the lever so as not to easily rotate from the neutral position. The remote control device 81 according to the second embodiment is adapted to the market that does not require the function of holding the lever so as not to easily rotate from the neutral position. According to the first and second embodiments of the present invention, since the two types of remote control devices 31, 81 respectively adapted to the two types of markets different from each other in demand can be manufactured by the substantially common manufacturing process using the substantially common component, a manufacturing cost of the remote control devices 31, 81 can be reduced comprehensively. In addition, manufacturing of the remote control device 31 and manufacturing of the remote control device 81 can be easily switched for each small manufacturing quantity (for example, for each lot), and a ratio of manufacturing quantities of the remote control device 31 and the remote control device 81 can be flexibly adjusted.

Further, according to the remote control device 81 according to the second embodiment of the present invention, by selecting the thickness T of the movement restriction member 82, it is possible to easily select whether to disable the function of the lever holding mechanism 65 or to change the function of the lever holding mechanism 65 such that the lever holding mechanism 65 functions as the detent mechanism. Therefore, it is possible to easily manufacture, at low cost, a remote control device having a detent function of stopping the lever 32 in an easily rotatable state to the neutral position N and a remote control device not having such a detent function.

Third Embodiment

Figure 9:
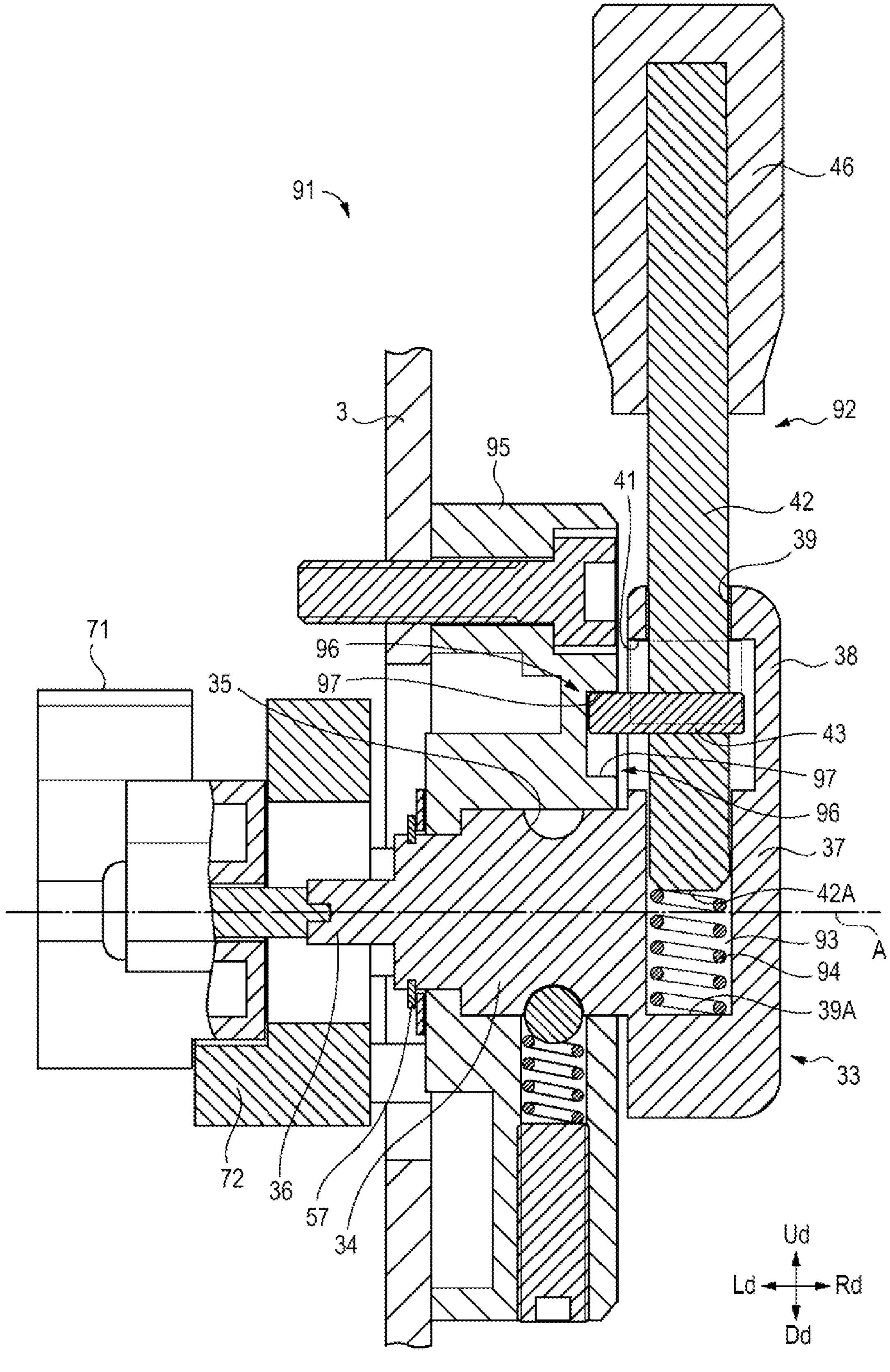
FIG. 9 is a cross-sectional view showing a remote control device according to a third embodiment of the present invention.
Figure 10:
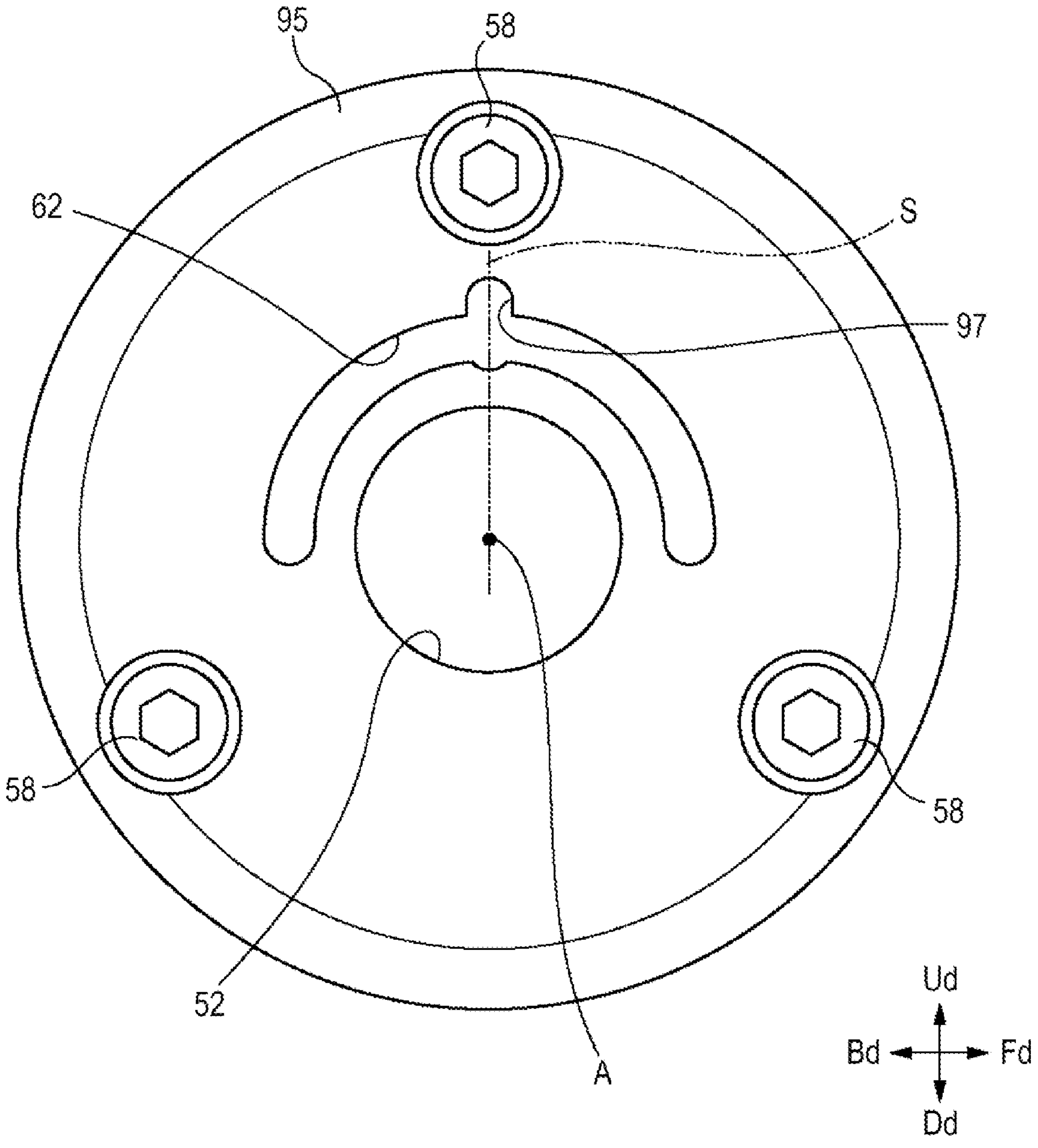
FIG. 10 is an explanatory view showing a state in which a holder in the remote control device according to the third embodiment of the present invention is viewed from a right side.

FIG. 9 shows a remote control device 91 according to a third embodiment of the present invention. A position (cutting position) of a cross section of the remote control device 91 in FIG. 9 is the same as the position of the cross section of the remote control device 31 in FIG. 5. FIG. 10 shows a state in which the holder 51 of the remote control device 91 is viewed from a right side. In the remote control device 91 according to the third embodiment shown in FIGS. 9 and 10, the same components as those of the remote control device 31 according to the first embodiment are denoted by the same reference numerals.

The remote control device 31 according to the first embodiment described above has the configuration in which the non-rotatable holding state of the lever 32 by the lever holding mechanism 65 is released by pulling the operation portion 42 upward, whereas the remote control device 91 according to the third embodiment has a configuration in which a non-rotatable holding state of a lever 92 by a lever holding mechanism 96 is released by pushing the operation portion 42 downward.

As shown in FIG. 9, in the remote control device 91 according to the third embodiment, a spring accommodation portion 93 is provided in a bottom side portion (a lower end side portion when the lever 32 is positioned at the neutral position N) of the insertion hole 39 formed in the connection portion 37 of the lever 92, and a holding spring 94 is provided in the spring accommodating portion 93. One end portion (a lower end portion in FIG. 9) of the holding spring 94 is in contact with a bottom surface 39A of the insertion hole 39, and the other end portion (an upper end portion in FIG. 9) of the holding spring 94 is in contact with a base end portion 42A of the operation portion 42. The holding spring 94 biases the operation portion 42 in a direction away from the rotation axis A (upward when the lever 32 is positioned at the neutral position N). In this way, the lever 92 of the remote control device 91 according to the third embodiment is different from the lever 32 of the remote control device 31 according to the first embodiment in arrangement of the spring accommodating portion 93 and the holding spring 94 and a direction in which the holding spring 94 biases the operation portion 42, but is the same as the lever 32 of the remote control device 31 according to the first embodiment except for these points.

The lever holding mechanism 96 of the remote control device 91 according to the third embodiment includes the holding pin 43 fixed to the operation portion 42 and a lever holding groove 97 formed in a holder 95. As shown in FIG. 10, the lever holding groove 97 is a groove formed in a right surface of the holder 95. The lever holding groove 97 extends in parallel to the straight line S that passes through the neutral position N and is orthogonal to the rotation axis A. When the holder 95 is viewed from the right side, the lever holding groove 97 overlaps the straight line S. The lever holding groove 97 extends upward from a portion of the rotation restriction groove 62 positioned at the neutral position N. A lower end portion of the lever holding groove 97 intersects with the portion of the rotation restriction groove 62 positioned at the neutral position N, and is connected to the portion.

The lever holding mechanism 96 holds the lever 92 at the neutral position N so as not to be rotatable when the lever 92 is at the neutral position N and the operation portion 42 moves in the direction away from the rotation axis A (specifically, upward) with respect to the base portion 33. That is, when the lever 92 is positioned at the neutral position N, the operation portion 42 is pushed upward by a biasing force of the holding spring 94 and moves upward with respect to the base portion 33. Thereby, a left end portion of the holding pin 43 enters the lever holding groove 97 and moves to an upper end portion in the lever holding groove 97. In this way, the lever 92 is held at the neutral position N so as not to be rotatable.

Since the operation portion 42 is biased in the direction away from the rotation axis A by the holding spring 94, when the user rotates the lever 92 to the neutral position N, the operation portion 42 automatically moves upward by the holding spring 94, and the holding pin 43 automatically enters the lever holding groove 97. Since the operation portion 42 (holding pin 43) is biased by the holding spring 94 in the direction away from the rotation axis A, when the lever 92 is positioned at the neutral position N, the operation portion 42 moves upward and the holding pin 43 is maintained in the lever holding groove 97, and the lever 92 is maintained in the non-rotatable holding state.

On the other hand, in the state in which the lever 92 is held by the lever holding mechanism 96 at the neutral position N, when the user grips the grip 46 and pushes the operation portion 42 downward against the biasing force of the holding spring 94, the operation portion 42 moves downward with respect to the base portion 33, and the left end portion of the holding pin 43 comes out of the lever holding groove 97. Thereby, the non-rotatable holding state of the lever 32 is released, and the lever 92 is rotatable from the neutral position N.

The holder 95 of the remote control device 91 according to the third embodiment is the same as the holder 51 of the remote control device 31 according to the first embodiment except that the lever holding groove 97 is different from the lever holding groove 66 of the remote control device 31 according to the first embodiment as described above. In the remote control device 91 according to the third embodiment, the rotation restriction mechanism 61, the detection unit 71 and the weight adjustment mechanism 75 are the same as those of the remote control device 31 according to the first embodiment.

The remote control device 91 according to the third embodiment having such a configuration also has same operational effects the same as those of the remote control device 31 according to the first embodiment.

As described above, in the remote control device 81 according to the second embodiment, by adding the movement restriction member 82 to the remote control device 31 according to the first embodiment, a function of the lever holding mechanism 65 is disabled, or a function of the lever holding mechanism 65 is changed such that the lever holding mechanism 65 functions as a detent mechanism. Similarly, also by adding the movement restriction member 82 to the remote control device 91 according to the third embodiment, a function of the lever holding mechanism 96 can be disabled, or a function of the lever holding mechanism 96 can be changed such that the lever holding mechanism 96 functions as a detent mechanism. In this case, the movement restriction member 82 is attached to an upper side of the holding pin 43 (a position indicated by a two-dot chain line in FIG. 9) in the operation portion 42.

The remote control device 31 (81, 91) according to each of the above embodiments is a so-called side mount type or flash mount type remote control device having a configuration in which the device is attached to a surface extending, in a vertical direction in the ship 1 or a component provided in the ship 1, such that a rotation axis is orthogonal to the surface, but the present invention is not limited thereto. The present invention can also be applied to a so-called top mount type remote control device (operation device) having a configuration in which the device is attached to a surface (upper surface) extending in a horizontal direction, in the ship 1 or a component provided in the ship 1, such that a rotation axis is parallel to the surface.

In the first or second embodiment, the holding spring 45 may not be provided. That is, when the lever 32 is positioned at the neutral position N, the operation portion 42 may move downward with respect to the base portion 33 by its own weight.

The remote control device 31 (81, 91) according to each of the above embodiments adopts a method of detecting a rotation direction and a rotation angle of the lever 32 (92) by the detection unit 71 and outputting a detection signal indicating the detection result from the detection unit 71 to the outboard motor 11 as a method of controlling the outboard motor 11, but the present invention is not limited thereto. The present invention can also be applied to a remote control device (operation device) that adopts a method of controlling an outboard motor by mechanically connecting the remote control device and the outboard motor via a cable and pushing or pulling the cable according to rotation of a lever as a method of controlling the outboard motor.

The power source of the outboard motor 11 controlled by the remote control device 31 (81, 91) is not limited to the engine, and may be an electric motor, or may be a hybrid power source in which the engine and the electric motor are combined. When the power source of the outboard motor 11 is the electric motor, a rotation direction of the propeller 20 can be switched by switching a rotation direction of an output shaft of the electric motor based on control by the control unit 24. In a case of such a configuration, the clutch 21 may not be provided in the outboard motor 11. In this case, when the lever 32 (92) of the remote control device 31 (81, 91) is positioned at the neutral position N, the electric motor is stopped based on the control by the control unit 24.

The remote control device 31 (81, 91) may control a ship propulsion machine other than an outboard motor, for example, an inboard motor or an inboard/outboard motor. The ship provided with the remote control device 31 (81, 91)

is not limited to a small ship as shown in FIG. 1, and a size and a type of the ship provided with the remote control device 31 (81, 91) are not limited.

The present invention can be appropriately changed without departing from the gist or idea of the invention which can be read from the claims and the entire specification, and an operation device for a ship propulsion machine accompanied by such a change is also included in the technical idea of the present invention.

What is claimed is:

1. An operation device configured to be performed an operation related to a propulsive force of a ship generated by a ship propulsion machine provided in the ship, the operation device comprising:

a lever rotatable about a rotation axis and configured to be performed the operation related to the propulsive force of the ship by being rotated;

a holder fixed to the ship or a component provided in the ship and rotatably supporting the lever;

a rotation restriction mechanism configured to restrict a rotation range of the lever with respect to the holder to a predetermined rotation range including a forward movement operation range in which an operation of increasing or decreasing a propulsive force for moving the ship forward is performed, a backward movement operation range in which an operation of increasing or decreasing a propulsive force for moving the ship backward is performed, and a neutral position at which the propulsive force of the ship is not generated; and a lever holding mechanism configured to hold the lever at the neutral position, wherein the lever includes a base portion supported by the holder so as to be rotatable about the rotation axis, and an operation portion connected to the base portion, extending in a direction intersecting the rotation axis, and configured to rotate the base portion with respect to the holder by being gripped and moved by a hand, and the operation portion is connected to the base portion so as to be movable with respect to the base portion in an extending direction of the operation portion, and wherein the lever holding mechanism holds the lever at the neutral position so as not to be rotatable when the lever is positioned at the neutral position and the operation portion moves toward one side in the extending direction of the operation portion with respect to the base portion, and brings the lever into a rotatable state from the neutral position when the lever is positioned at the neutral position and the operation portion moves toward the other side in the extending direction of the operation portion with respect to the base portion.

2. The operation device according to claim 1, wherein the operation portion is provided with a protruding portion protruding from the operation portion toward the holder, wherein the rotation restriction mechanism includes the protruding portion and a rotation restriction portion provided on a facing surface of the holder facing the operation portion, formed of a groove or a hole extending in a rotation direction of the lever, and into which a tip end portion of the protruding portion is inserted, wherein the lever holding mechanism includes the protruding portion and a lever holding portion provided on the facing surface of the holder, connected to the rotation restriction portion, and formed of a groove or a hole extending in parallel to a straight line that passes through the neutral position and is orthogonal to the rotation axis, and wherein, when the lever is positioned at the neutral position, the operation portion moves toward the one side in the extending direction of the operation portion with respect to the base portion and the protruding portion enters the lever holding portion, whereby the lever is held at the neutral position so as not to be rotatable.

3. The operation device according to claim 1, wherein the lever is provided with a movement restriction member configured to prevent the operation portion from moving toward the one side in the extending direction of the operation portion with respect to the base portion, or to reduce an amount by which the operation portion moves toward the one side in the extending direction of the operation portion with respect to the base portion, thereby preventing the lever from being held so that the lever is not rotatable by the lever holding mechanism at the neutral position when the lever is positioned at the neutral position.

4. The operation device according to claim 1, wherein the lever is provided with a biasing member configured to bias the operation portion toward the one side in the extending direction of the operation portion with respect to the base portion.

5. The operation device according to claim 1, wherein the holder is provided with a weight adjustment mechanism configured to adjust a weight of the lever when the lever is rotated, by changing a strength of a frictional force applied to the lever.

6. The operation device according to claim 1, wherein the holder is attached to a surface extending in a vertical direction, in the slip or a component provided in the ship, such that the rotation axis is orthogonal to the surface.

* * * * *